US012723677B2

(12) United States Patent
Ball et al.

(10) Patent No.: US 12,723,677 B2
(45) Date of Patent: Sep. 1, 2026

(54) PIPE SUPPORT SYSTEM

(71) Applicant: WCM Industries, Inc., Colorado Springs, CO (US)

(72) Inventors: William T. Ball, Colorado Springs, CO (US); Eric Pilarczyk, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 10 days.

(21) Appl. No.: 18/936,743

(22) Filed: Nov. 4, 2024

(65) Prior Publication Data

US 2026/0126133 A1 May 7, 2026

(51) Int. Cl.
*F16L 3/02* (2006.01)
*F16L 3/18* (2006.01)

(52) U.S. Cl.
CPC .. *F16L 3/02* (2013.01); *F16L 3/18* (2013.01)

(58) Field of Classification Search
CPC ... F16L 3/02; F16L 3/127; F16L 3/243; F16L 3/18
See application file for complete search history.

(56) References Cited

U.S. PATENT DOCUMENTS 1,788,939 A * 1/1931 Axlund ................. F16L 59/135 174/136
2,103,811 A * 12/1937 Davis ........................ F16L 3/18 248/55
2,767,947 A * 10/1956 Stewart ..................... F16L 3/18 248/55
2,893,669 A * 7/1959 Kindorf .................... F16L 3/18 248/55
3,769,190 A * 10/1973 Deem, Jr. ............. F16L 3/2053 204/196.15
4,502,653 A * 3/1985 Curtis, Jr. ................. F16L 3/18 248/74.1
5,217,191 A * 6/1993 Smith ....................... F16L 3/18 248/55
5,906,341 A * 5/1999 Brown .................... F16L 3/227 248/68.1
6,364,256 B1 * 4/2002 Neider ...................... F16L 3/18 248/68.1
6,502,791 B2 * 1/2003 Parker ....................... F16L 3/18 248/405
6,520,456 B1 * 2/2003 Neider ...................... F16L 3/01 248/65
6,592,093 B2 * 7/2003 Valentz ..................... F16L 3/18 248/677

(Continued)

*Primary Examiner* — Eret C Mcnichols

(57) ABSTRACT

A pipe support system is disclosed. In some examples, the pipe support system includes a roller, a support base, and in some examples one or more support adapters. The support base and support adapters are configured to be fitted together. Additional support adapters may fit into lower support adapters to extend the height of pipe support system (e.g., the support adapters are stackable with other support adapters and/or with the support base). The roller may be configured to fit into a topmost component of pipe support system, whether it be the support base or a support adapter. The roller may be configured to rotate within the support base or the support adapter to facilitate axial movement of a pipe disposed atop the roller.

18 Claims, 22 Drawing Sheets

(56) References Cited

U.S. PATENT DOCUMENTS

| | | | | |
|---|---|---|---|---|
| 7,441,731 | B2 * | 10/2008 | Smart | F16L 3/02 248/68.1 |
| 7,661,240 | B2 * | 2/2010 | Sargent | F16L 3/137 248/156 |
| 8,646,731 | B2 * | 2/2014 | Burles | F16L 3/16 144/287 |
| 10,724,656 | B2 * | 7/2020 | Comalander | B23K 37/0533 |
| 10,774,951 | B2 * | 9/2020 | Ball | F16L 3/127 |
| 11,165,230 | B1 * | 11/2021 | Jordan | H02G 1/02 |
| 11,280,430 | B2 * | 3/2022 | Phillips | F16L 3/08 |
| 11,619,326 | B1 * | 4/2023 | Nguyen | F16F 1/3842 166/308.1 |
| 2002/0020787 | A1 * | 2/2002 | Parker | F16L 3/18 248/70 |
| 2008/0145151 | A1 * | 6/2008 | Rodrigue | H02G 1/06 405/184.4 |
| 2014/0197282 | A1 * | 7/2014 | Turner | F16L 3/18 248/49 |
| 2019/0145547 | A1 * | 5/2019 | Ball | F16B 7/185 248/558 |
| 2020/0018428 | A1 * | 1/2020 | Comalander | F16L 3/02 |
| 2025/0237328 | A1 * | 7/2025 | Kummer, Jr. | F16L 3/243 |

* cited by examiner 100
104
100
109
103
102
132
118

PIPE SUPPORT SYSTEM

BACKGROUND

Service piping may be installed in horizontal or substantially horizontal orientations along roofs, floors, and other indoor or outdoor surfaces. Such piping may include hot water (or steam) and chilled water piping for heating and cooling applications, respectively. Other service piping may include domestic hot water and cold water, storm drainage, or sewer piping. Additionally, specialty piping such as chemical and/or gas piping for industrial processes may be installed. Typically, all of these types of piping are installed above the surface along which they are routed to maintain required clearances, to accommodate thermal expansion and contraction, and to increase visibility thereof to reduce potential damage. In another application, electrical wiring (within or outside of protective conduit) may be installed.

It is with respect to this general technical environment that aspects of the present technology disclosed herein have been contemplated. Furthermore, although a general environment is discussed, it should be understood that the examples described herein should not be limited to the general environment identified herein.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an aspect, the present application relates to a pipe support system, comprising: a roller configured to support a pipe; a support adapter, wherein the support adapter is configured to receive the roller in a first cavity of the support adapter, and wherein the roller is configured to rotate in the first cavity; and a support base configured to receive the support adapter in a second cavity of the support base.

In some examples, the support base comprises: a base portion comprising a substantially flat base surface; and a support portion extending upwards from the substantially flat base surface.

In some examples, the support base comprises at least one first protrusion disposed on a first inner surface of the support base, wherein the first protrusion extends from the first inner surface into the second cavity.

In some examples, the support adapter comprises at least one protrusion recess configured to receive the at least one first protrusion of the support base.

In some examples, the support adapter comprises at least one second protrusion disposed on a second inner surface of the support adapter, wherein the first protrusion extends from the second inner surface into the first cavity, and wherein the roller is configured to fit into the first cavity substantially below the at least one second protrusion.

In some examples, the support base comprises at least one slot disposed on an underside of the support base.

In some examples, the support base comprises a plurality of curved surfaces having substantially concave shapes, and wherein the support adapter comprises a corresponding plurality of curved portions having substantially convex shapes, and wherein the curved portions are configured to fit into and contact the plurality of curved surfaces.

In some examples, the support base, the support adapter, or a combination thereof, comprises a plurality of apertures disposed on top surfaces of the support base, the support adapter, or the combination thereof, and wherein the plurality of apertures are configured to receive corresponding fasteners to secure a pipe strap to the pipe support system.

In some examples, the first cavity is substantially identical to the second cavity.

In some examples, the support base and the support adapter combine to define a central aperture extending through the support base and the support adapter.

In some examples, the support adapter is configured to snap into the support base.

In another aspect, the present application relates to a pipe support system, comprising: a roller configured to support a pipe; and a support base configured to receive the roller in a first cavity of the support base, wherein the support base comprises: a base portion comprising a substantially flat base surface; and a support portion extending upward from the substantially flat base surface, wherein the roller is configured to snap into the first cavity and be freely rotatable within the first cavity.

In some examples, the support base comprises at least one first protrusion disposed on a first inner surface of the support base.

In some examples, the support base comprises at least one slot disposed on an underside of the support base.

In some examples, the support base comprises a plurality of curved surfaces having substantially concave shapes.

In some examples, a lowest portion of the roller extends above a lowest portion of the plurality of curved surfaces when the roller is snapped into the support base.

In some examples, the support base comprises a plurality of side apertures disposed on supporting surfaces of the support base, and wherein the support base comprises a central aperture extending through a bottom of the support base and into the first cavity.

In another aspect, the present application relates to a pipe support system, comprising: a roller configured to support a pipe; a support adapter comprising a protrusion recess disposed in an insert of the support adapter and comprising a protrusion, wherein the protrusion has a complementary shape to the protrusion recess; and a support base configured to receive the support adapter in a second cavity of the support adapter.

In some examples, the pipe support system further comprises a second support adapter comprising a second protrusion recess configured to fit into the protrusion of the support adapter.

In some examples, the support base comprises a second protrusion configured to fit into the protrusion recess of the support adapter.

It is to be understood that both the foregoing general description and the following Detailed Description are explanatory and are intended to provide further aspects and examples of the disclosure as claimed.

BRIEF DESCRIPTION OF THE DRAWINGS

The following drawing figures, which form a part of this application, are illustrative of aspects of systems and methods described below and are not meant to limit the scope of the disclosure in any manner, which scope shall be based on the claims.

Figure 1:
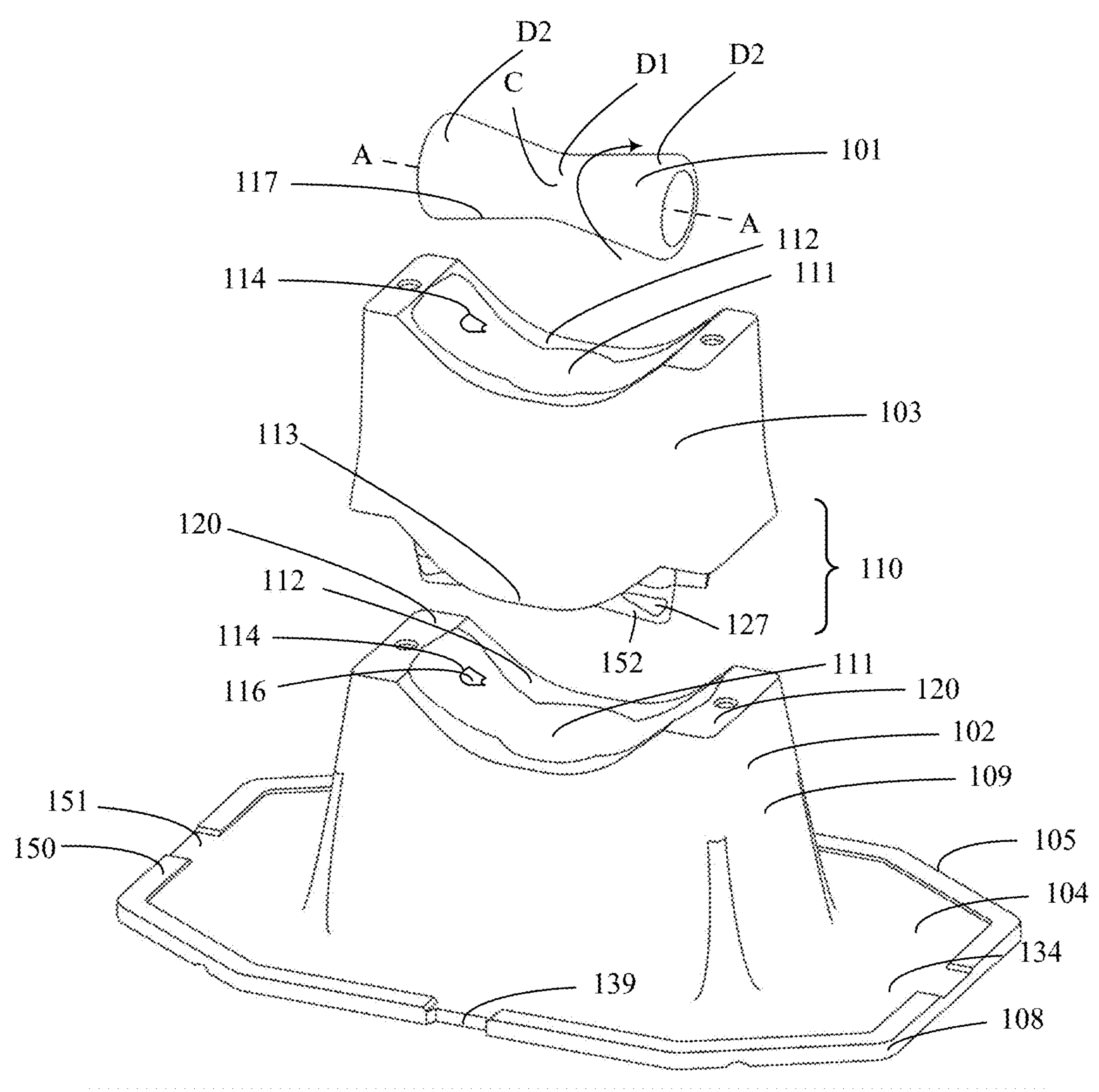
FIG. 1 illustrates an exploded, perspective view of an example pipe support system.

While examples of the disclosure are amenable to various modifications and alternative forms, specific aspects have been shown by way of example in the drawings and are described in detail below. The intention is not to limit the scope of the disclosure to the particular aspects described. On the contrary, the disclosure is intended to cover all modifications, equivalents, and alternatives falling within the scope of the disclosure and the appended claims.

DETAILED DESCRIPTION

As discussed briefly above, the devices described herein can be used to support various service piping (exposed, insulated, or otherwise encased), conduits, wiring, or other elongate structures. As a nonexclusive example, the specification describes the devices in the context of piping support.

The pipe support systems described herein are configured to be field-assembled and adjustable to support one or more pipe(s) installed above an underlying surface (e.g., a roof surface). The pipe support systems are robust so as to accommodate piping while not tipping over. A roller is rotatable and disposed in a pipe support system to enable the piping to be axially moveable across the roller (e.g., due to thermal expansion or installation) so that stresses incurred by the piping and the pipe support system are decreased. For example, during installation of piping, the rollers enable the piping to roll across the top of the pipe support systems. This configuration increases installation efficiencies and reduces wear on the piping. Furthermore, the rollers decrease frictional resistance of the pipe support system so that as the pipe(s) are pushed across the top, the pipe support system does not tip over. In contrast, support systems for piping that employ a static support may be prone to tip over during pipe installation or thermal expansion post-installation. In addition, presently disclosed pipe support systems provide an option of excluding a roller, but still using a same support base and/or adapters, for instances in which accommodations for axial pipe movement are not required. Additionally, examples described herein provide for pipe support systems of configurable height (e.g., via stacking), allowing for pipe support systems to accommodate various environments. Additionally, examples described herein provide for a simple installation and setup process involving relatively few parts to keep track of. Stacked pipe support components may be held together by a band or a strap as described herein, also facilitating easier installation and/or shipping.

Referring concurrently to FIGS. 1-22, the pipe support system 100 includes a roller 101, a support base 102, and in some examples one or more support adapter 103. As illustrated in FIG. 1, support base 102 and support adapter 103 are configured to be fitted together. Additional support adapters, such as support adapter 103, may be stacked and snapped into support adapter 103 to extend the height of pipe support system 100 (e.g., support adapters 103 may be configured to be stackable with other support adapters 103 and/or with support base 102). By enabling support base 102 and support adapter 103 to be fitted together, the pipe support system 100 can be assembled on-site, and shipping of the pipe support system 100 may be more efficient. Roller 101 may be configured to fit into a topmost component of pipe support system 100, whether it be support base 102 or a support adapter 103. Roller 101 may be configured to rotate within support base 102 or the support adapter 103 to facilitate axial movement of a pipe disposed on roller 101.

Figure 8:
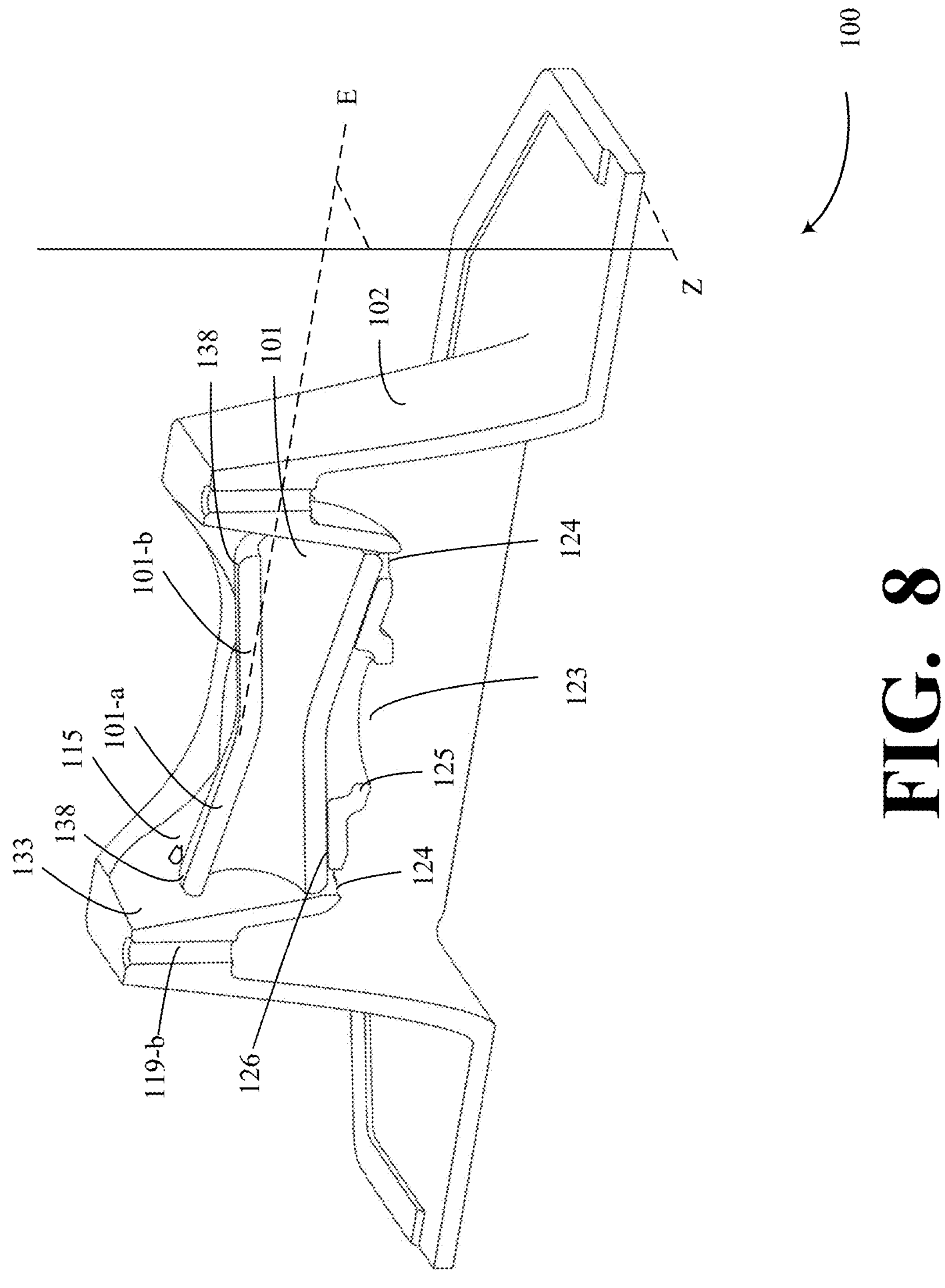
FIG. 8 illustrates a cross-sectional, perspective view of at least a portion of an example pipe support system.
Figure 9:
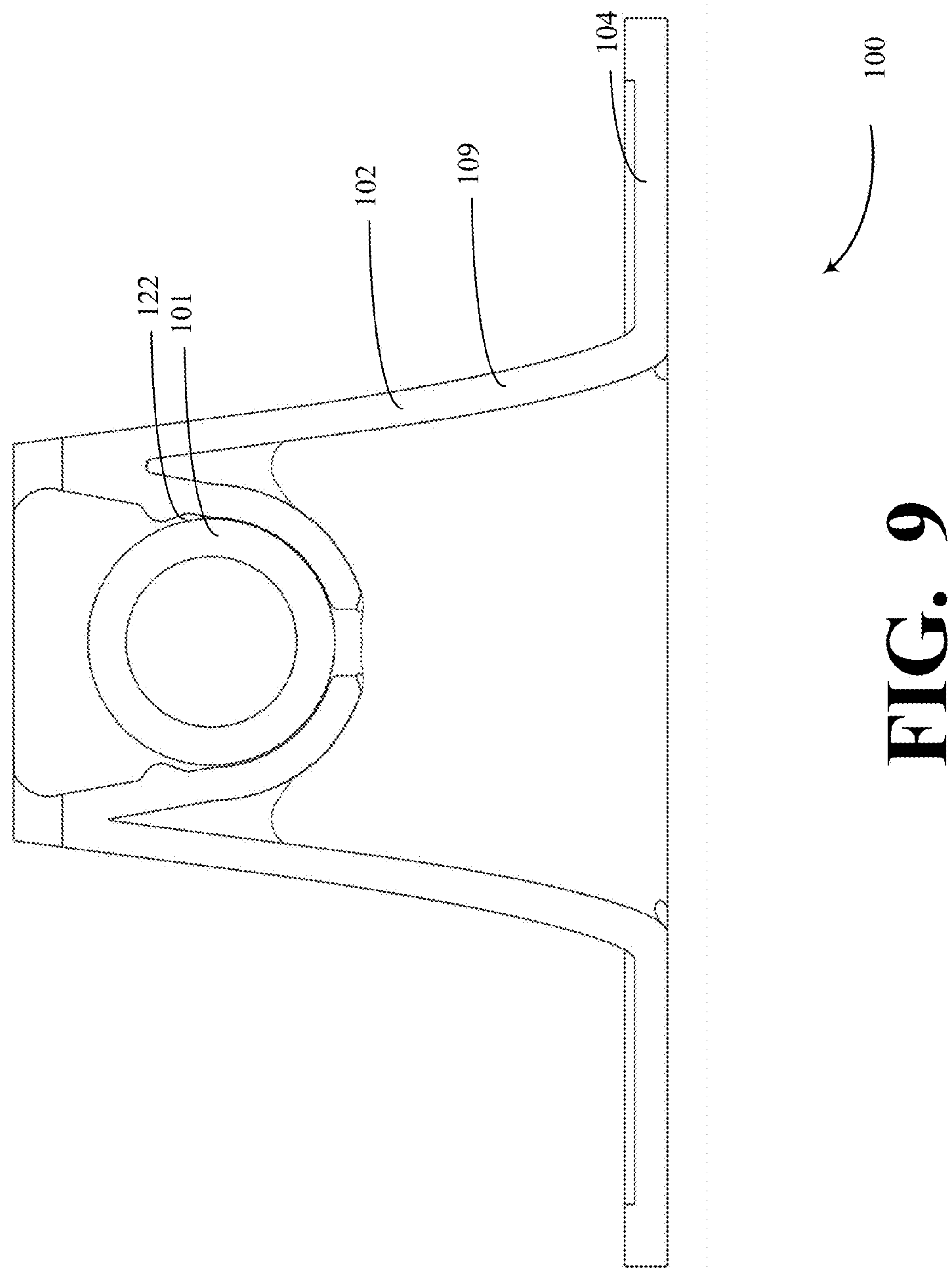
FIG. 9 illustrates a cross-sectional, side view of at least a portion of an example pipe support system.
Figure 10:
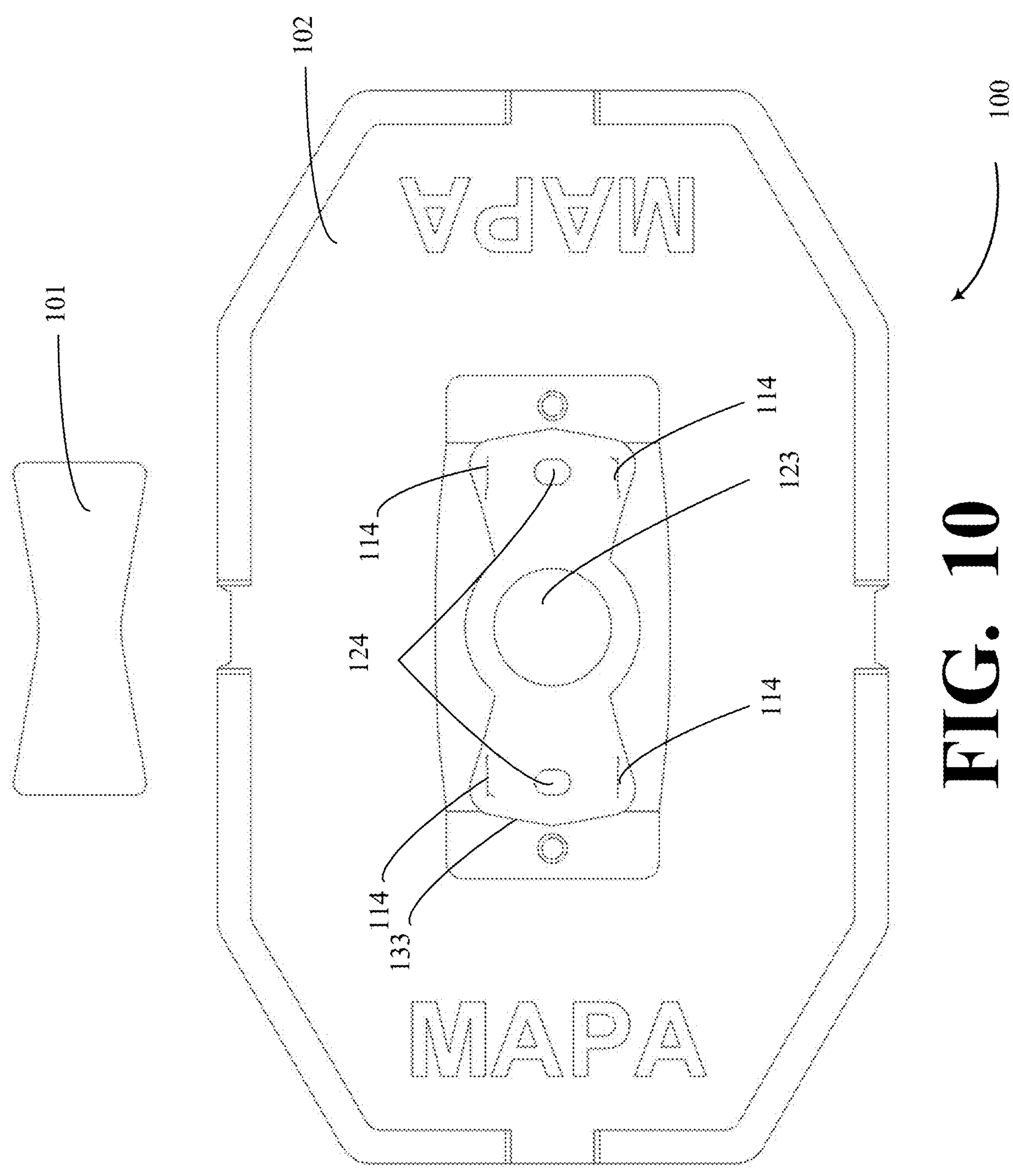
FIG. 10 illustrates a top view of at least a portion of an example pipe support system.
Figure 11:
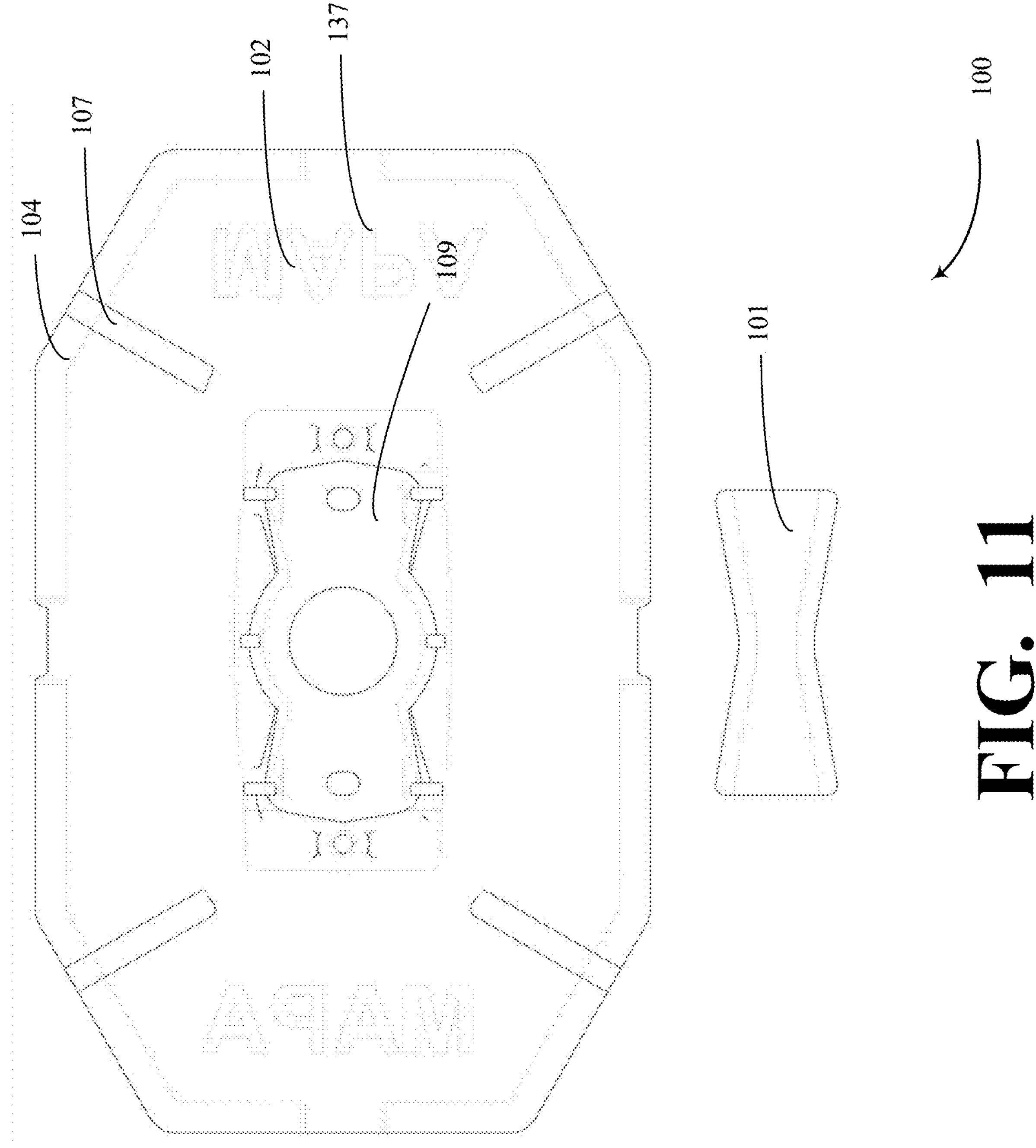
FIG. 11 illustrates a bottom view of at least a portion of an example pipe support system.
Figure 12:
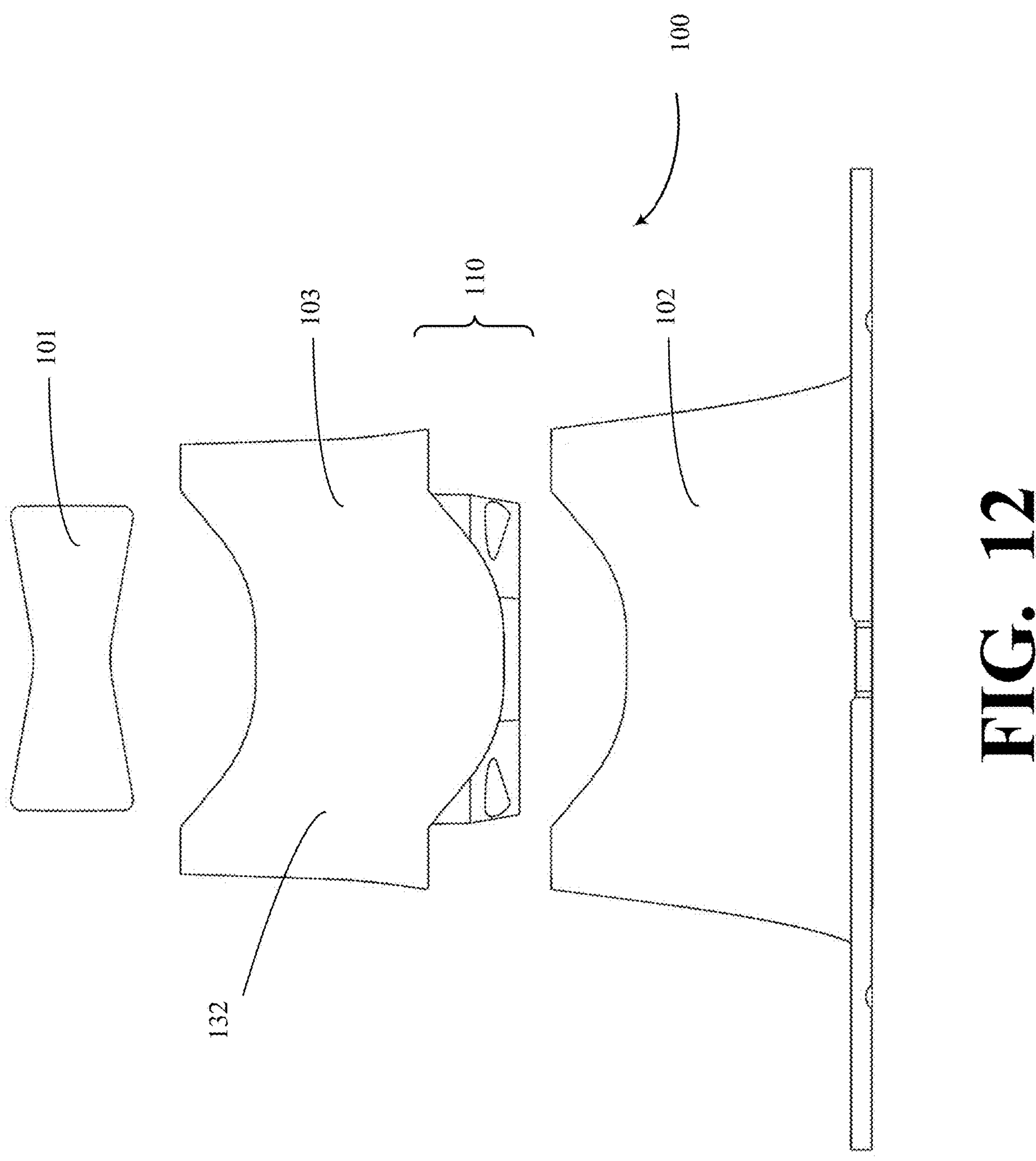
FIG. 12 illustrates an exploded front view of an example pipe support system.
Figure 13:
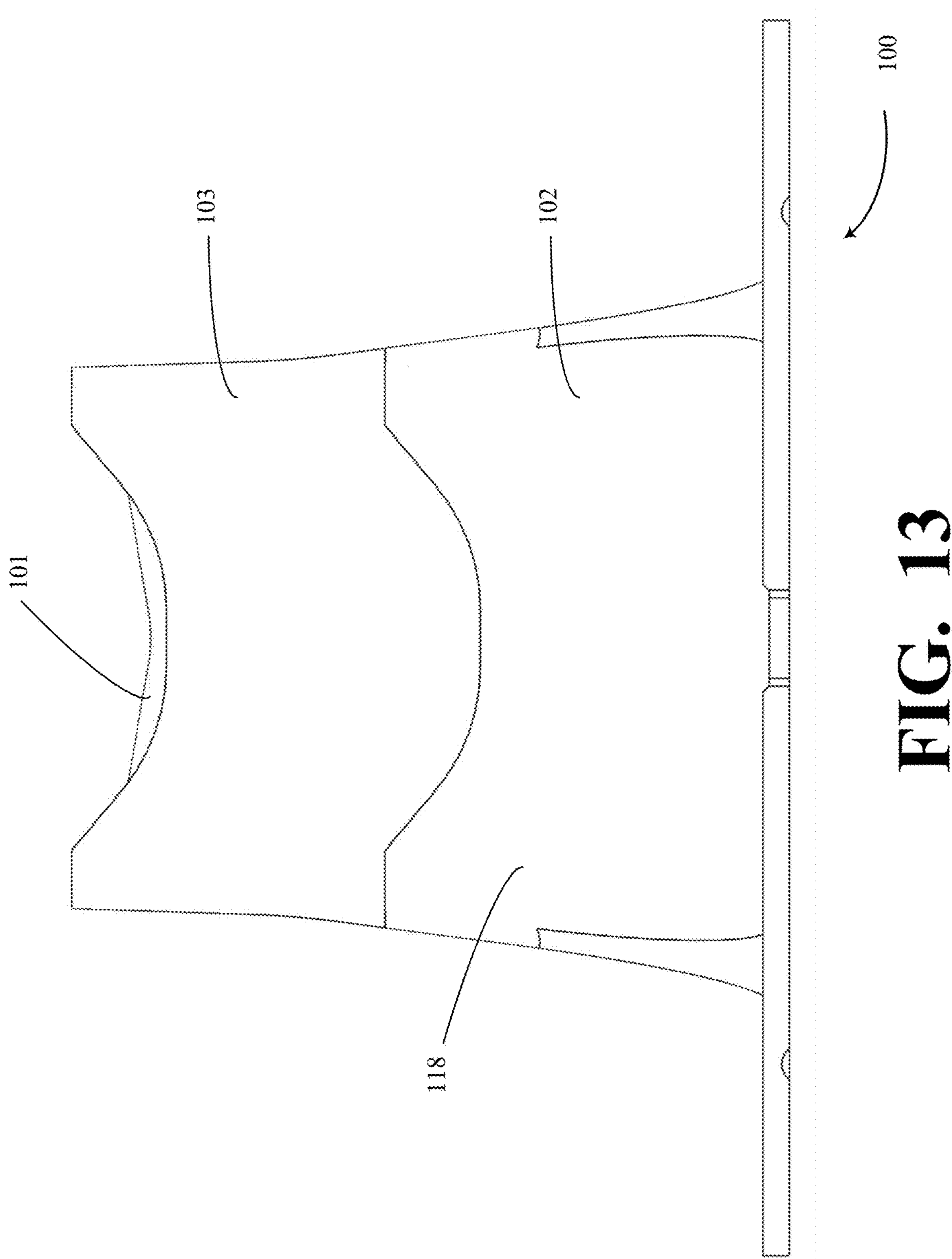
FIG. 13 illustrates a front view of an example pipe support system.
Figure 14:
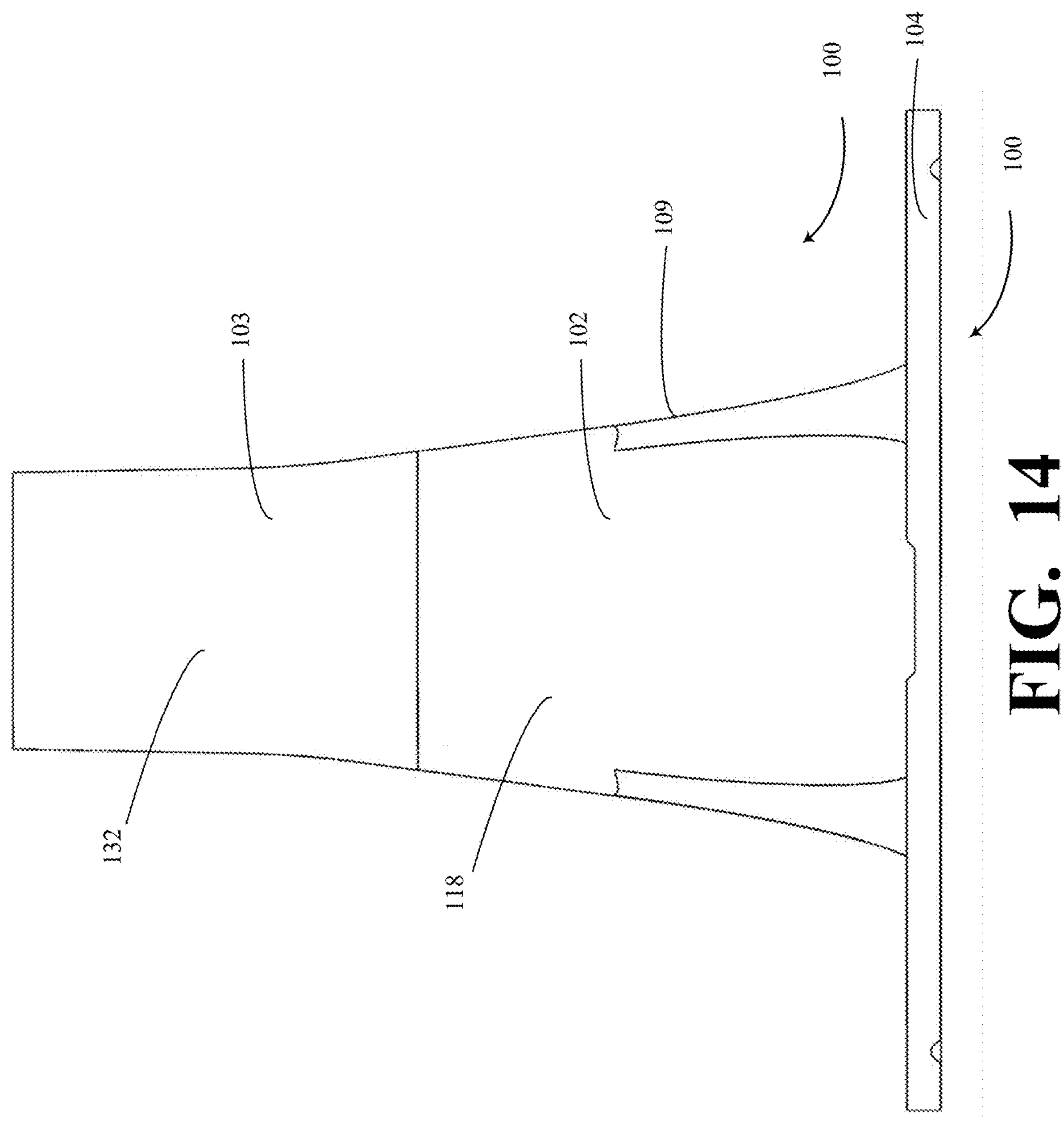
FIG. 14 illustrates a side view of an example pipe support system.
Figure 15:
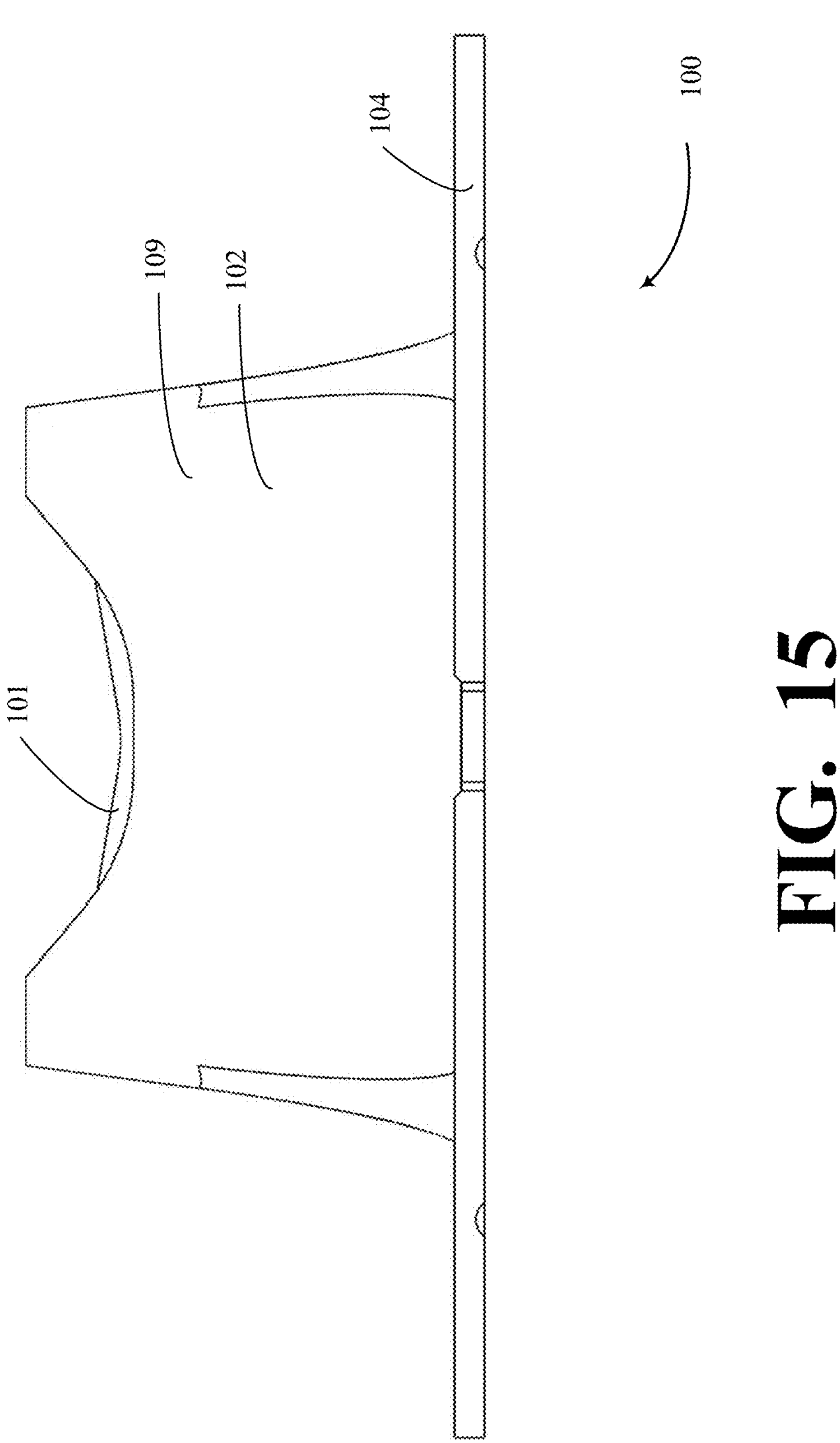
FIG. 15 illustrates a front view of at least a portion of an example pipe support system.
Figure 16:
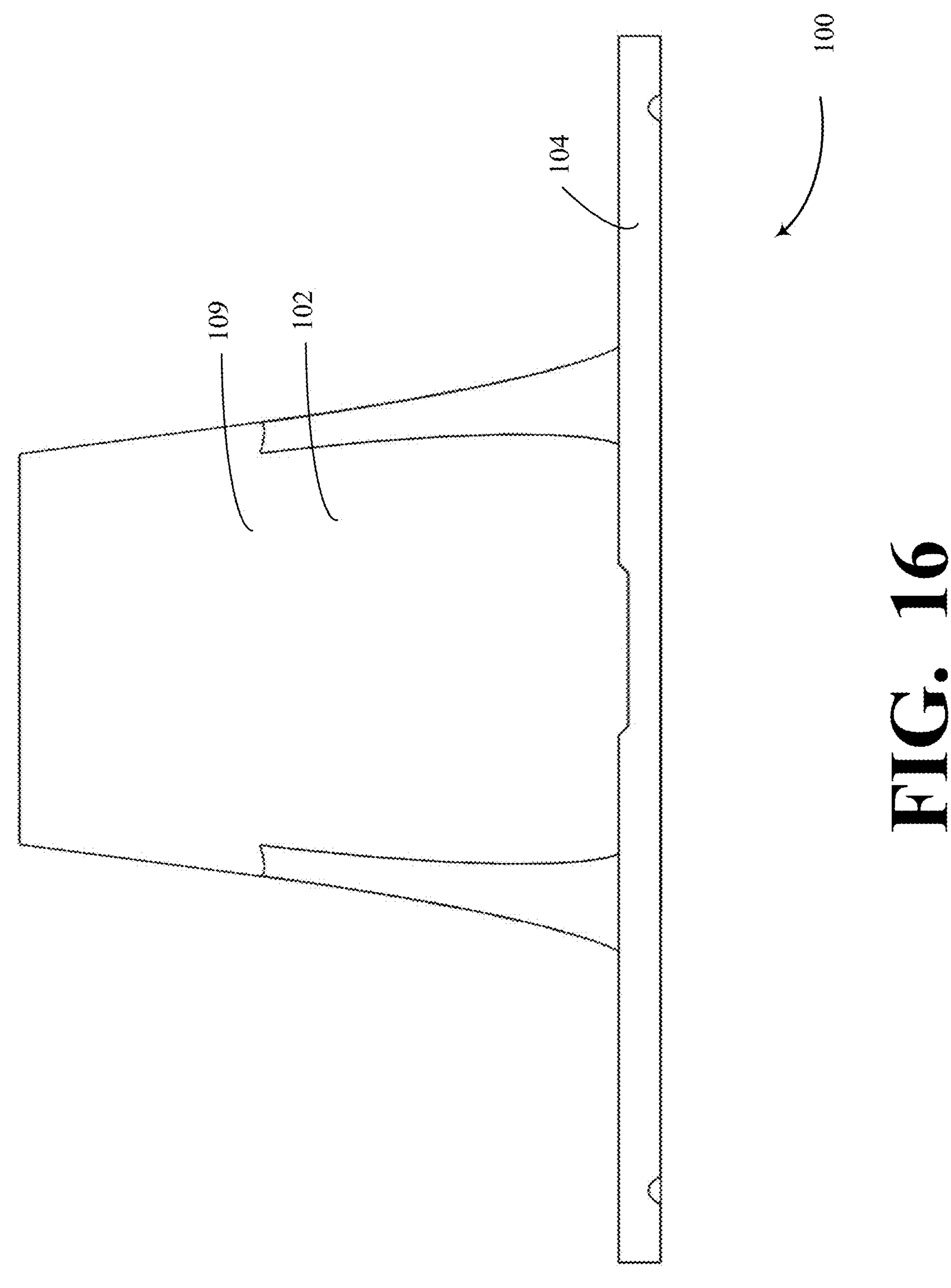
FIG. 16 illustrates a side view of at least a portion of an example pipe support system.
Figure 17:
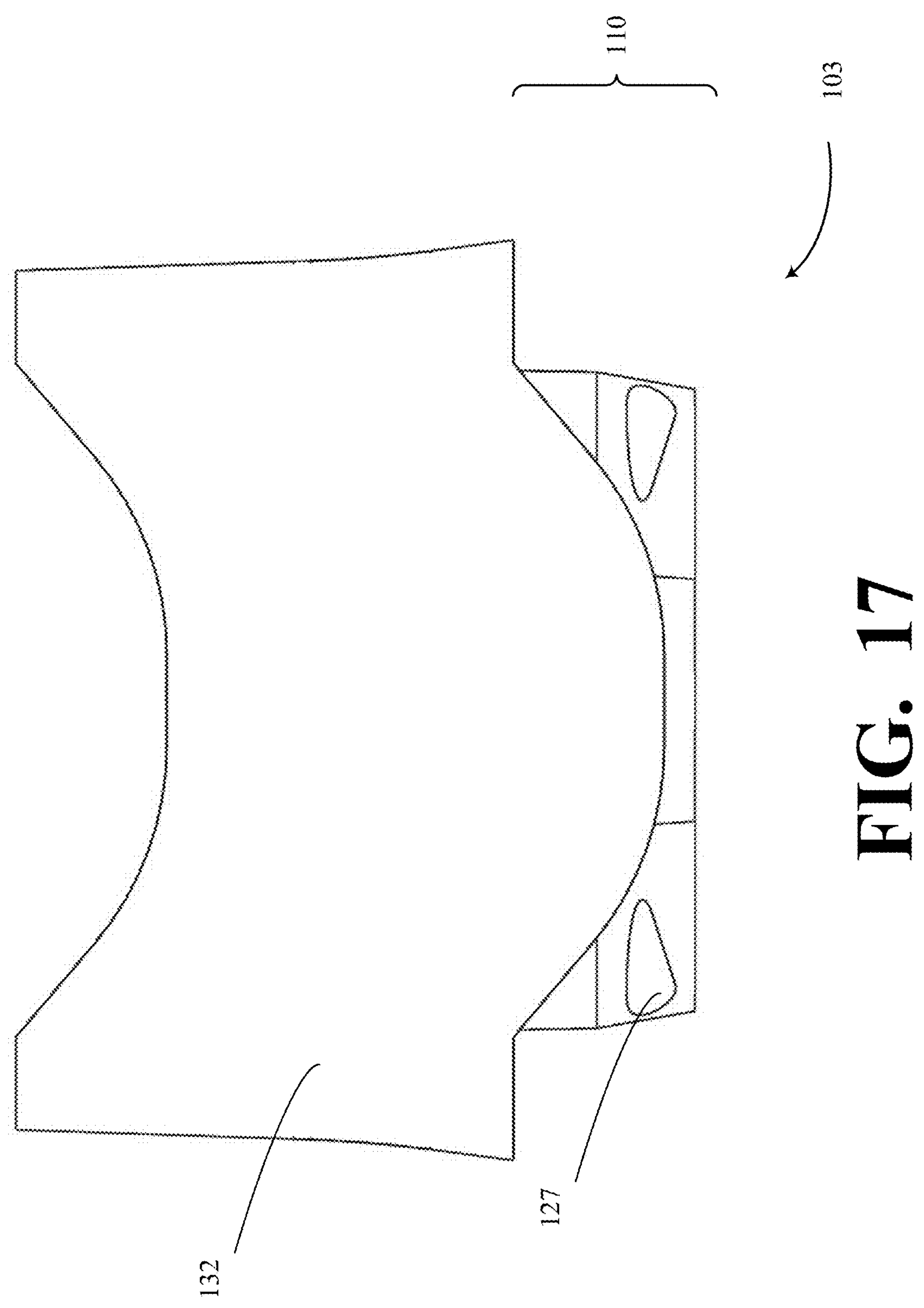
FIG. 17 illustrates a front view of an example support adapter of an example pipe support system.
Figure 18:
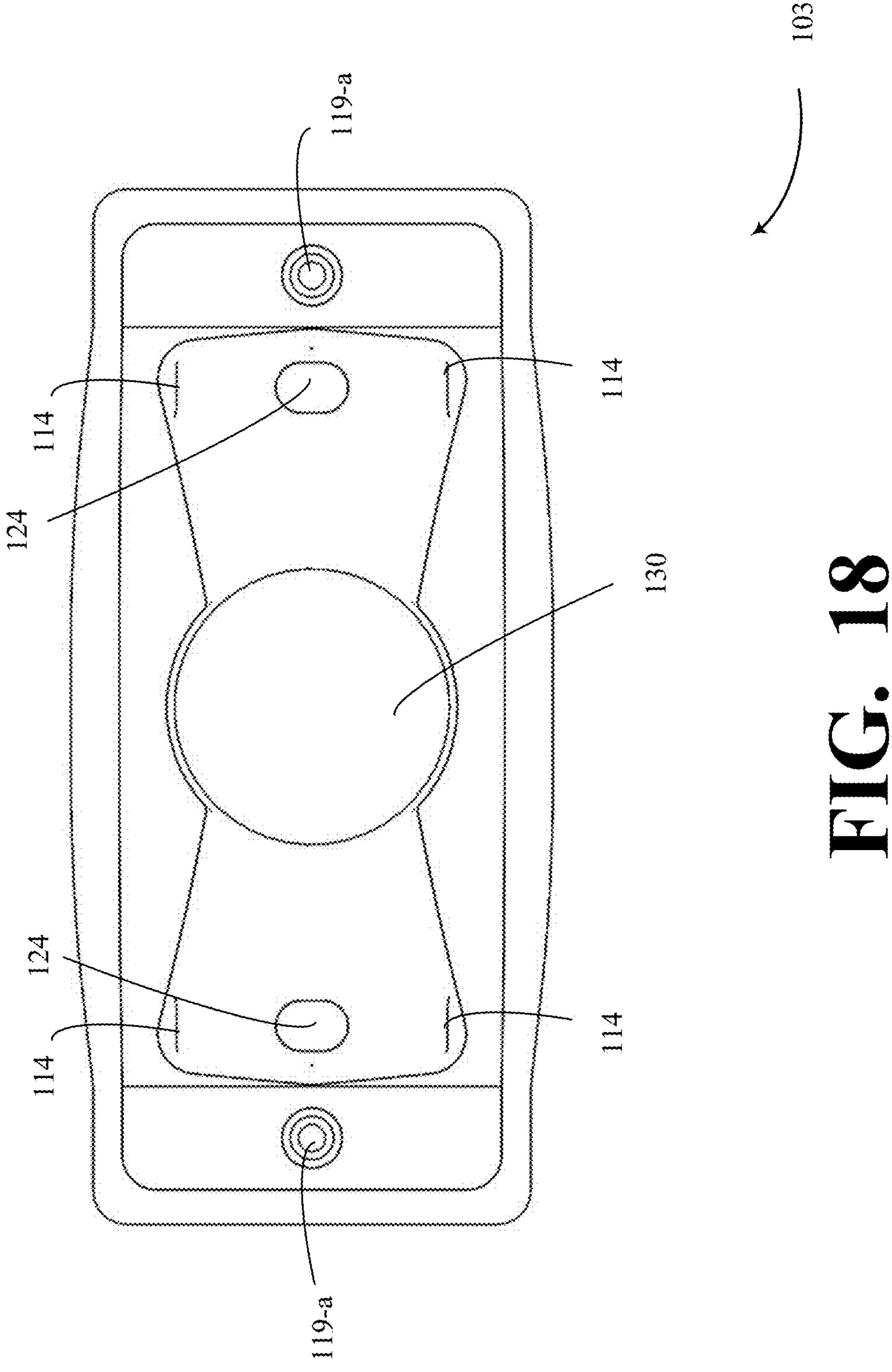
FIG. 18 illustrates a top view of an example support adapter.
Figure 19:
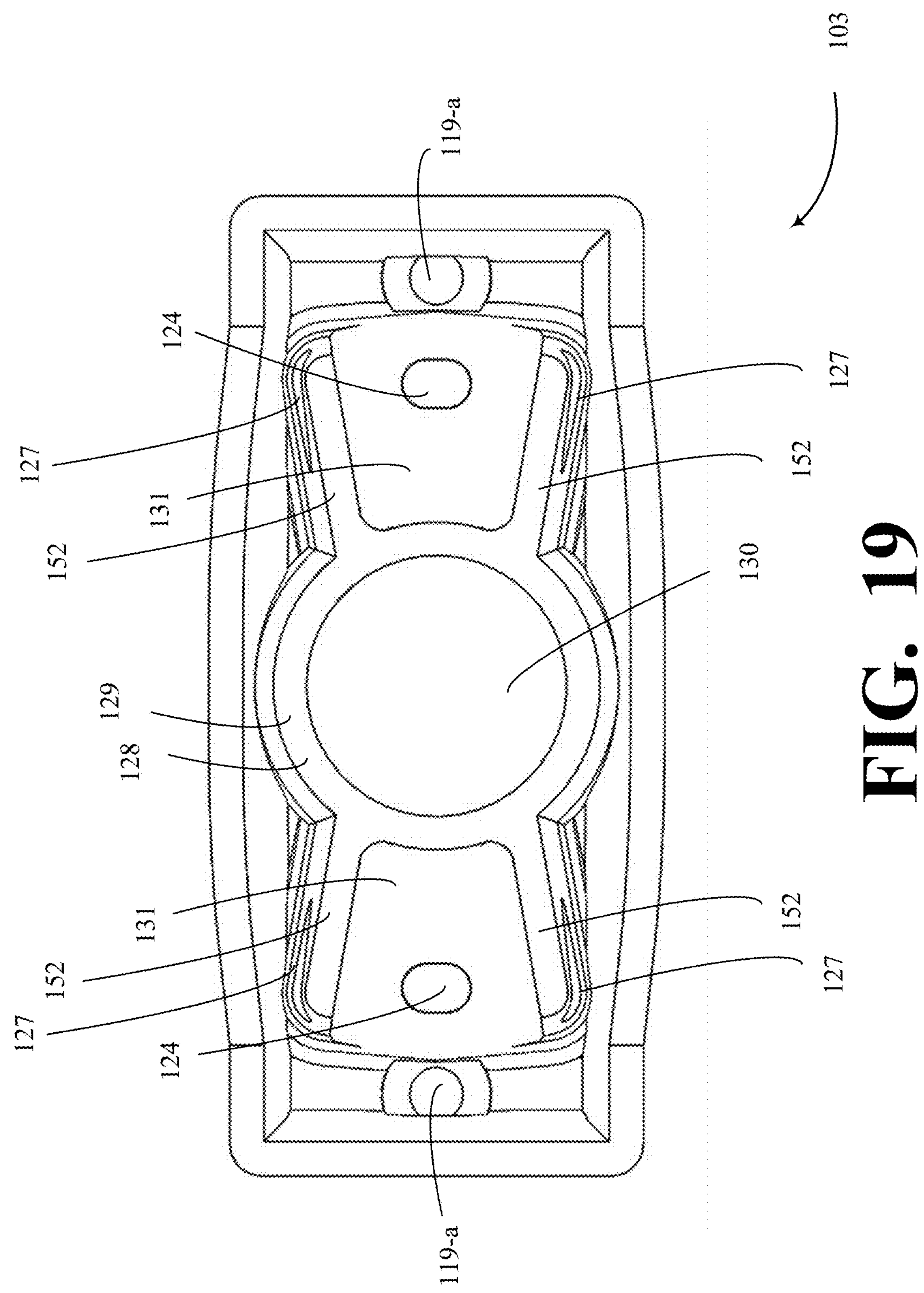
FIG. 19 illustrates a bottom view of an example support adapter.
Figure 20:
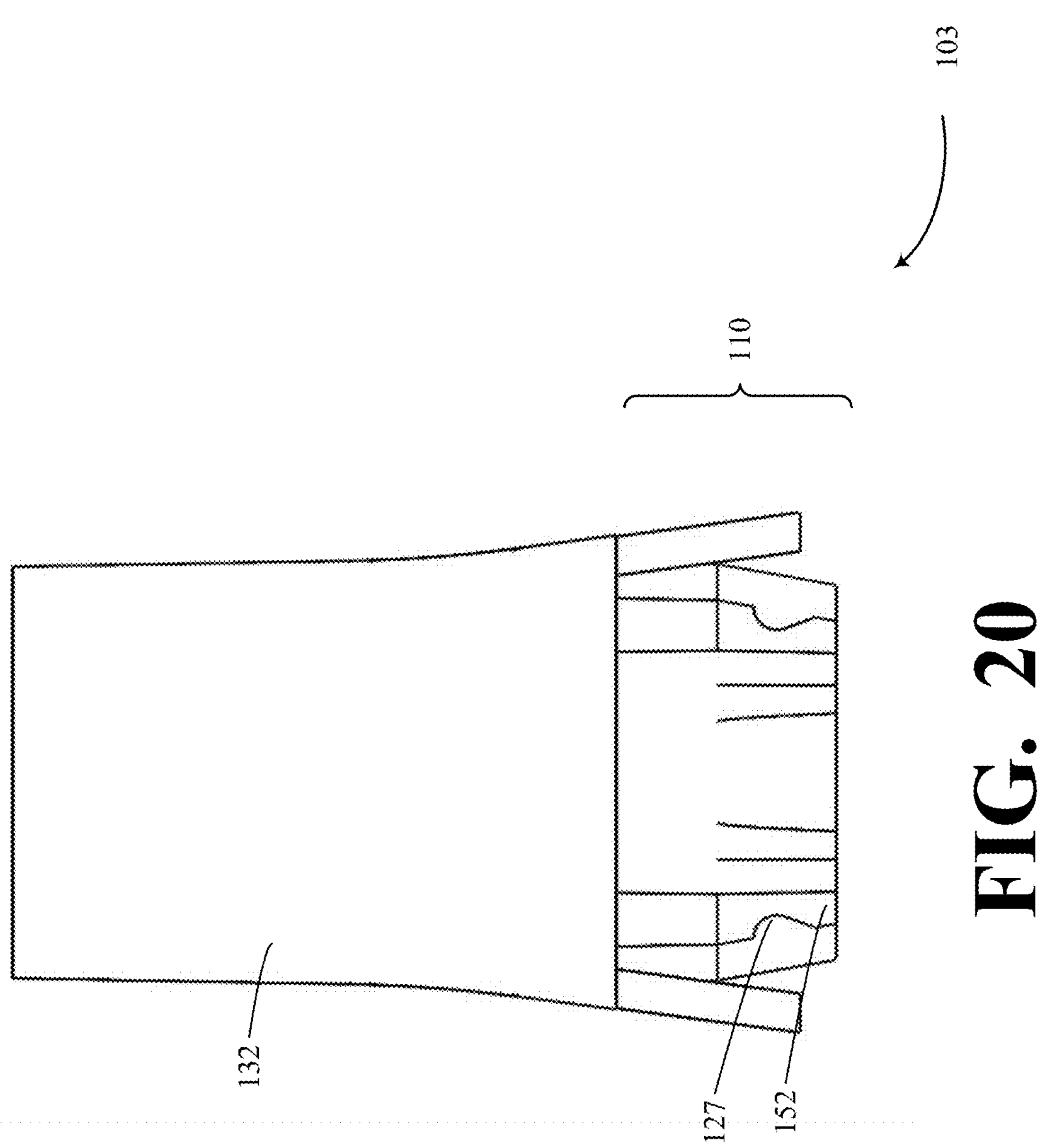
FIG. 20 illustrates a side view of an example support adapter.
Figure 21:
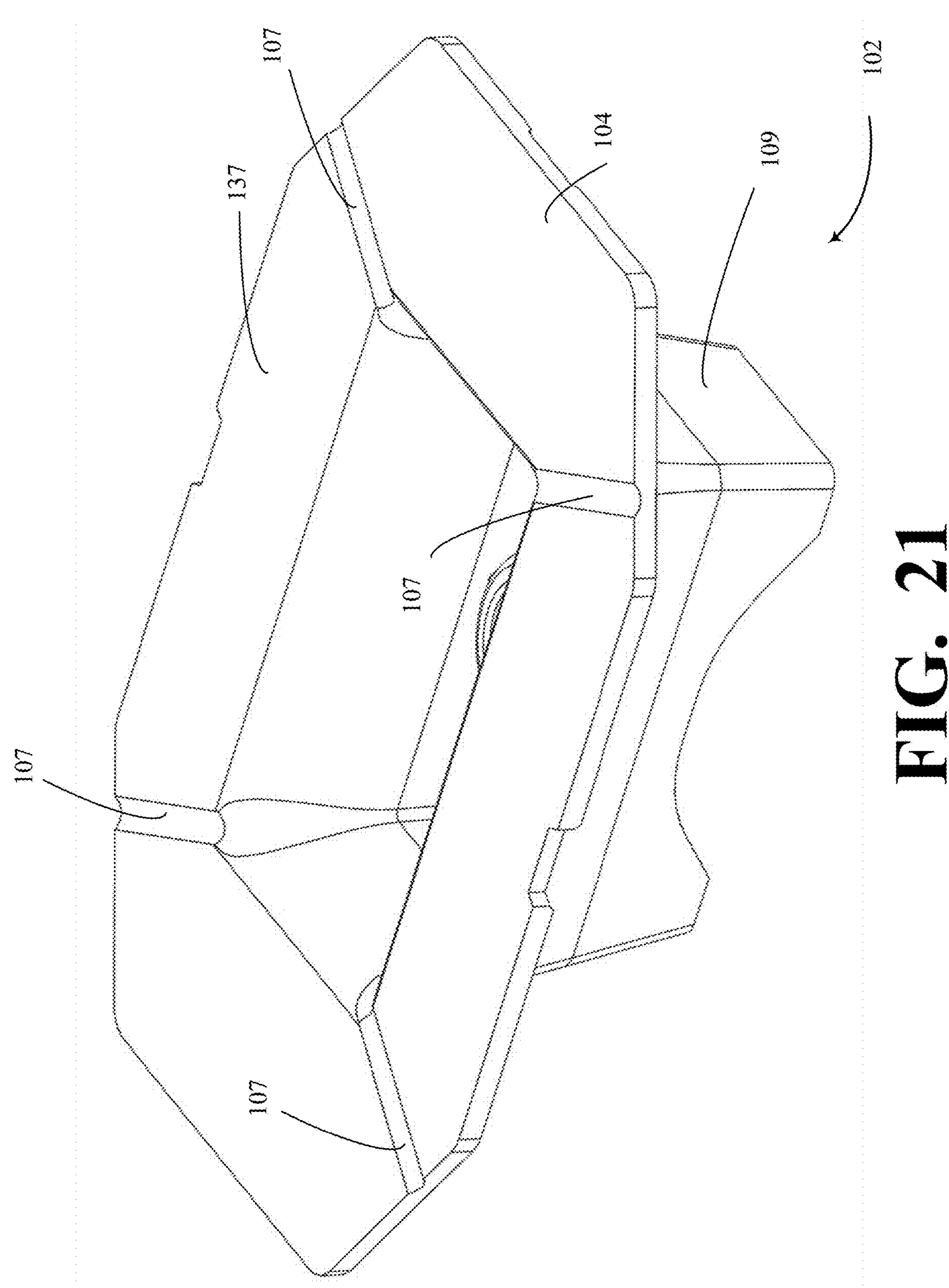
FIG. 21 illustrates an isometric view of a support base of an example pipe support system.

Roller 101 may include a single integral part including two substantially frustoconically shaped portions 101-*a* and 101-*b* joined at their narrowest sections (see, e.g., FIG. 8). For example, diameter $D_1$ may be less than diameters $D_2$; the portions with smaller diameter $D_1$ of the two substantially frustroconically shaped portions 101-*a* and 101-*b* may be substantially co-located, while the portions with larger diameters $D_2$ may be disposed towards the outside of roller 101 and away from center C (see, e.g., FIG. 1) of roller 101. As such, roller 101 may taper down towards center C of roller 101, allowing for supported pipes to be kept securely on roller 101 without falling off. In some examples, roller 101 may be hollow. In some other examples, roller 101 may be solid. In some examples, roller 101 may include two apertures 106-*a* and 106-*b* on either side of roller 101 (see, e.g., FIG. 4).

When disposed in support base 102 or in support adapter 103, roller 101 may be configured to contact first inner surfaces 115, supporting surfaces 126, and/or side surfaces 133 of support base 102 or support adapter 103. In some examples, first inner surfaces 115, supporting surfaces 126, and/or side surfaces 133, which may contact roller 101, may be coated in graphite or any other substance that reduces friction to facilitate smoother rotation of roller 101 (e.g., incurring less friction). In examples, the roller 101, first inner surfaces 115, supporting surfaces 126, and side surfaces 133 may also be shaped to minimize contact between the roller 101 and the support base 102 and/or support adapter 103 to decrease the effect of friction on rotation of the roller, when installed.

In examples, support base 102 may be formed as a single integral part, such as a molded plastic. Support base 102 may include a base portion 104 (see, e.g., FIG. 1) that is configured to be placed on an underlying surface and provide stability for the pipe support system 100 when placed on the underlying surface. The base portion 104 has a first length L1 (see, e.g., FIG. 2) that extends in a direction that is substantially orthogonal to the direction of the axis of rotation A about which roller 101 rotates and a second length L2 (see, e.g., FIG. 2) that extends in a direction that is substantially parallel to the direction of the axis of rotation A. L2 may be greater than L1, although other shapes are contemplated. Base portion 104 may include a substantially flat base surface 134 (see, e.g., FIG. 1). In some examples, chamfers 105 may be disposed at each of the corners of base portion 104. Base portion 104 may include one or more slots 107 (see, e.g., FIG. 11, FIG. 21) disposed on an underside of base portion 104 of support base 102. Slots 107 may extend to outside edge 108 of base portion 104 (e.g., from a location closer to a center of base portion 104 such as a cavity disposed under or inside support portion 109). Slots 107 may allow for fluid (e.g., water) to flow out from underneath base portion 104, preventing pipe support system 100 from moving around due to fluid that has gotten underneath or into base portion 104. Base portion 104 may include side indents 139 (see, e.g., FIG. 1) indented into outside edge 108 of base portion 104. Bands may be used to wrap around a stack of one or more support bases 102 and/or one or more support adapters 103, where the bands fit into side indents 139 to secure the stack. This may be useful during shipping when it is desirable to efficiently ship a large number of support bases 102 and/or support adapters 103. In examples, base portion 104 may also include a raised lip 150 around the perimeter of the base portion 104. The raised lip 150 may be interrupted by the side indents 139 and by slots 151 on the end sections of the base portion 104, which may allow water to escape the base portion 104.

Support base 102 may include support portion 109 (see, e.g., FIG. 1) disposed on base portion 104. For example, support portion 109 may extend substantially upwards from flat base surface 134. Support portion 109 may include various features to receive roller 101 in cavity 111 of support base 102 and/or to fit with bottom portion 110 of support adapter 103, as is described elsewhere herein.

Figure 2:
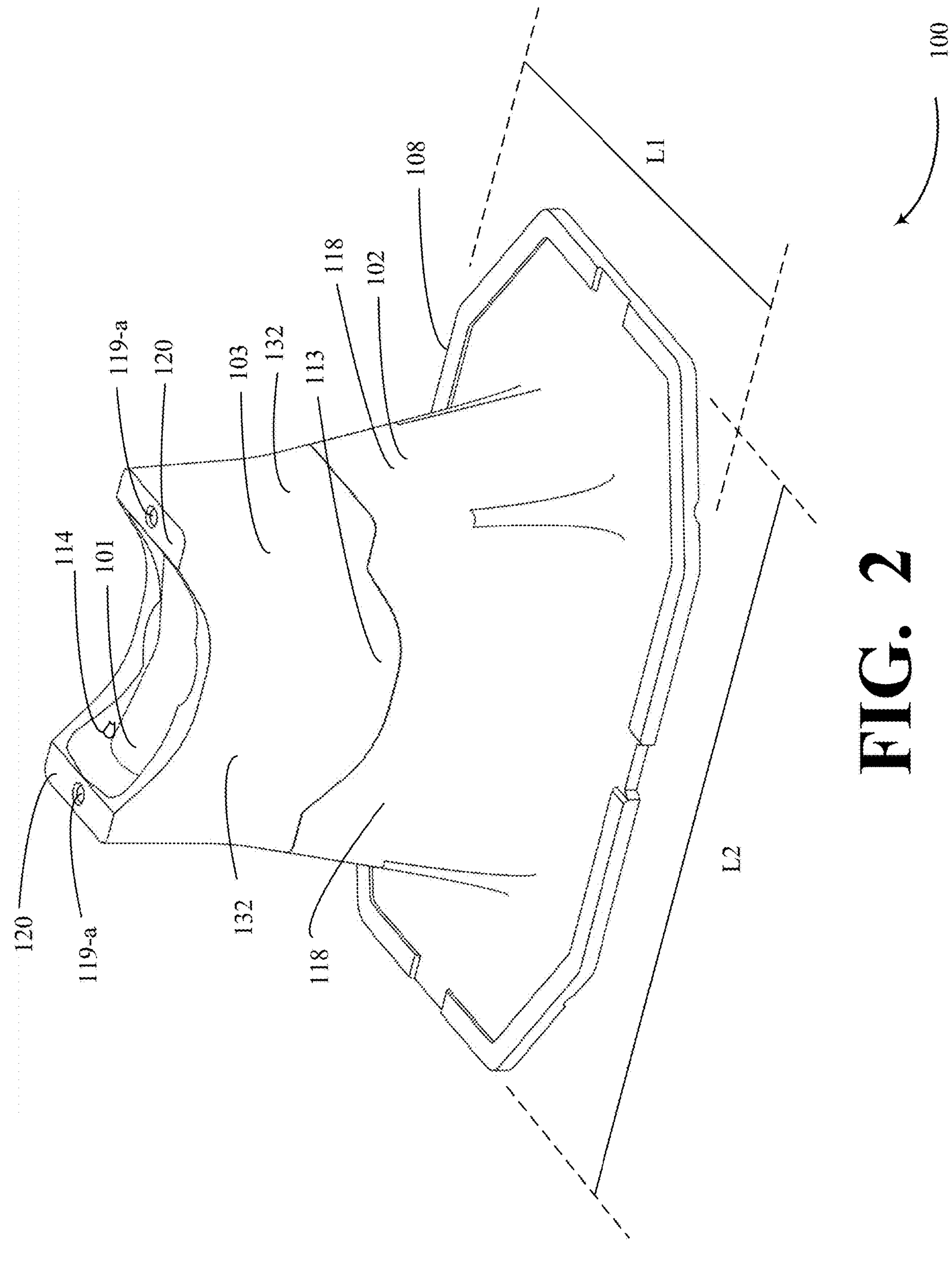
FIG. 2 illustrates a perspective view of an example pipe support system.

Support portion 109 may include side walls 118 (see, e.g., FIG. 2). In examples, side walls 118 may extend upwards from base portion 104. In some examples, side walls 118 may extend substantially orthogonally from base portion 104. Alternatively, and as pictured, side walls 118 may be angled with respect to an orthogonal direction from base portion 104. For example, side walls 118 may be angled inwards as side walls 118 extend upwards from base portion 104 and may form a generally trapezoidal shape or may be similar to side walls of a trapezoidal prism. Side walls 118 may be disposed on an outside of support portion 109. Support adapter 103 may include side walls 132, at least a portion of which may extend upwards from side walls 118 when support adapter 103 is installed in or support base 102. In some examples, at least a portion side walls 132 may be angled with respect to an orthogonal direction from base portion 104. For example, the portion of side walls 132 may be angled inwards (towards cavity 111) as the side walls 132 progress upwards away from base portion 104. An upper section of side walls 132 may be disposed above the angled portion of side walls 132 and may extend substantially orthogonally to base portion 104, in some examples. When support adapter 103 is installed in support base 102, side walls 132 may be configured to smoothly transition from side walls 118 and present a substantially continuous surface with side walls 118. In some examples, side walls 132 may be substantially perpendicular or extend substantially vertically, for example, with respect to base portion 104. For example, if an additional support adapter 103 is configured to be installed on top of a first support adapter 103, then the additional support adapter may have side walls 132 that extend vertically to present a continuous surface with tops of side walls 132 of the adapter 103 below it.

Figure 22:
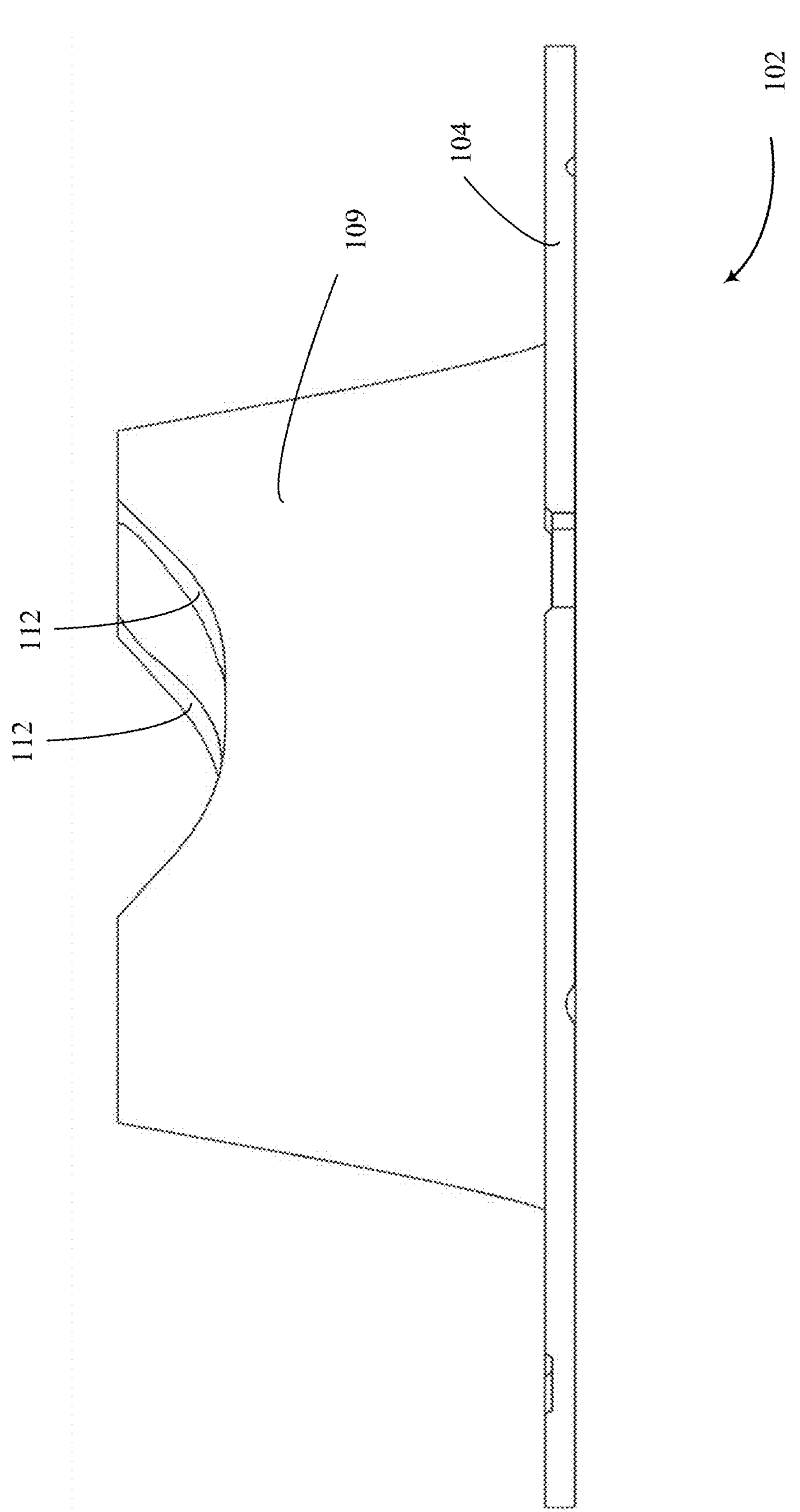
FIG. 22 illustrates an angled side and front view of a support base of an example pipe support system.

Support portion 109 may include curved surfaces 112 (see, e.g., FIG. 1, FIG. 22). Curved surfaces 112 match the contour of the underside of curved portions 113 (see, e.g., FIG. 2) of support adapter 103. For example, curved portions 113 may fit into and/or contact curved surfaces 112. When the support adapter 103 is secured in support base 102, curved portions 113 fit with curved surfaces 112. Curved surfaces 112 may be disposed substantially adjacent to, and extend between, top surfaces 120 and may be substantially adjacent to first inner surfaces 115. Curved surfaces 112 may be follow a substantially concave curve and extend closest to base portion 104 in a middle section. In examples, the concavity allows the curved surfaces 112 to support pipes or other elongated components when the support base 102 is used without roller 101. That is, a same support base 102 can be used without roller 101 to support pipes in applications where axial movements of the pipes being supported are not a concern. If accommodation of axial pipe movement is (or becomes) needed, then the roller 101 can easily be snapped into the support base 102 (or support adapter 103). Curved portions 113 of support adapter 103 may follow a substantially convex curve and extend closest to base portion 104 in a corresponding middle section to match the curved surfaces 112. Curved surfaces 112 may also be disposed in support adapter 103 (see, e.g., FIG. 1) and may function similarly when support adapter 103 is installed into support base 102 (or another support adapter 103).

Figure 6:
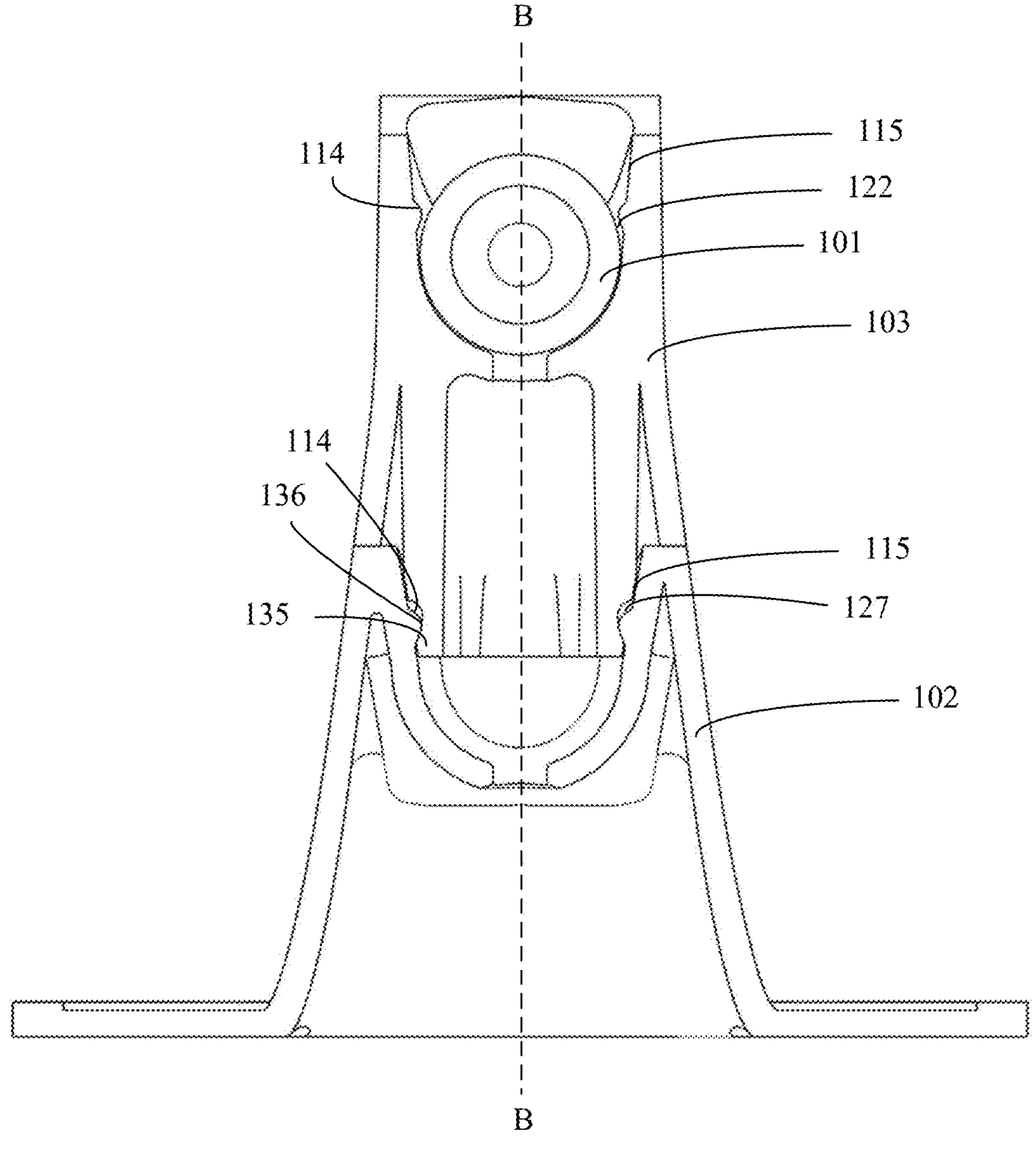
FIG. 6 illustrates a cross-sectional, side view of an example pipe support system.
Figure 7:
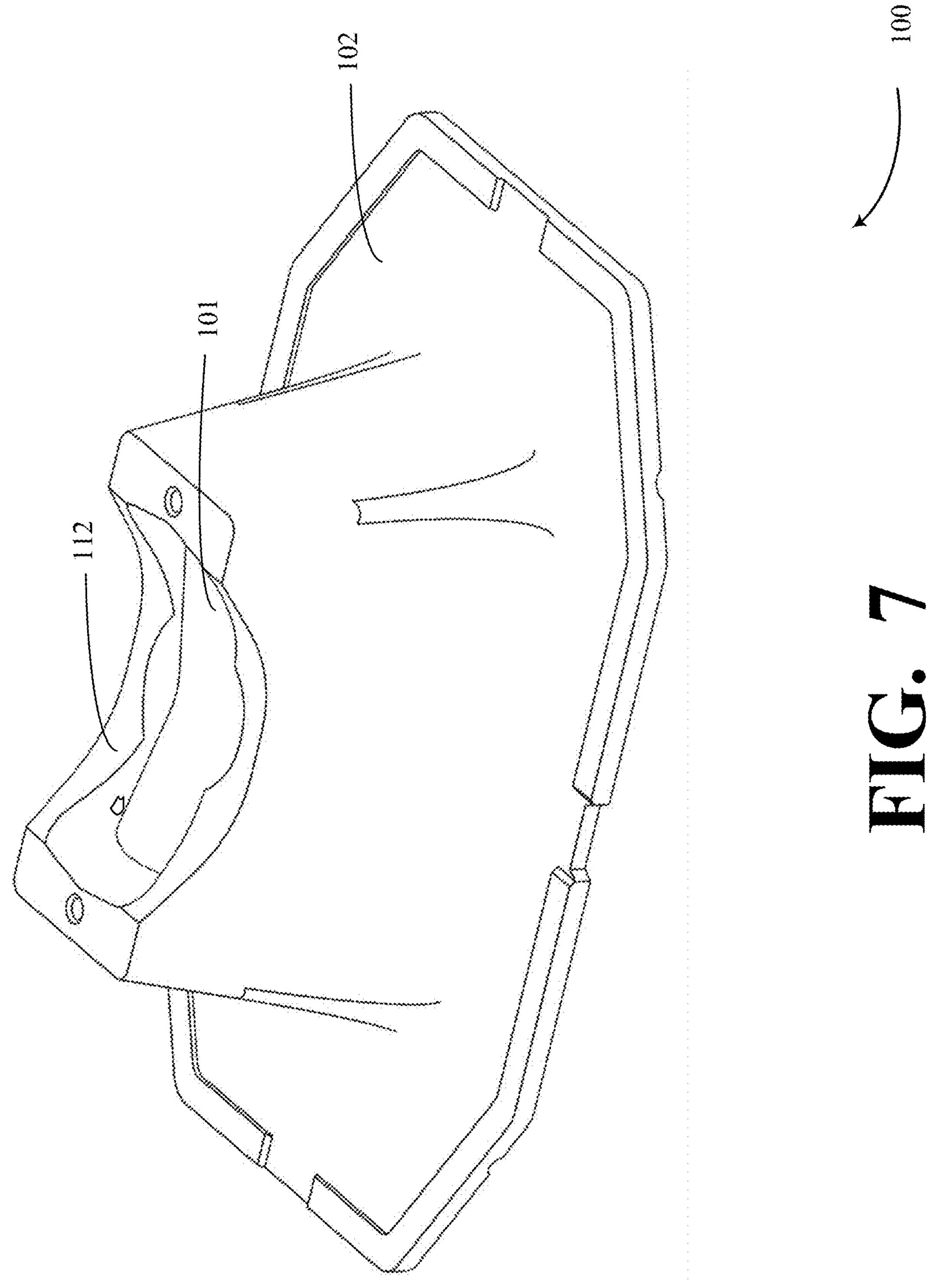
FIG. 7 illustrates a perspective view of at least a portion of an example pipe support system.

Support portion 109 may include four (or some other number of) protrusions 114 (see, e.g., FIG. 1, FIG. 6). Protrusions 114 may extend substantially into cavity 111 from first inner surfaces 115 (see, e.g., FIG. 6). Roller 101 may be configured to be snapped into cavity 111 of support portion 109 and may rest with its longitudinal axis below protrusions 114. In order to seat the roller 101 within cavity 111, the roller 101 may be pushed downward into cavity 111, causing the outside surface of roller 101 to elastically deform the protrusions 114 and/or the first inner surfaces 115 on which the protrusions 114 are disposed, thereby allowing the widest portion of roller 101 to be pushed past protrusions 114. Similar deformations may occur if/when the roller 101 is removed (snapped out) from cavity 111, e.g., by using a finger or tool to press upwardly on the roller 101 through central aperture 123. In examples, protrusions 114 may extend further inwards than widest portion of roller 101 when roller 101 is snapped into support portion 109 (see, e.g., FIG. 9). That is, the outside diameter of roller 101 may be greater than the shortest distance between two protrusions 114 on opposite inner surfaces 115. This may be similarly applicable when roller 101 is received in support adapter 103 (see, e.g., FIG. 6). In examples, the shape of cavity 111 and position and configuration of protrusions 114 may be identical or substantially identical in support adapter 103 as in support base 102. In examples, the cavity 111 of support base 102 is bounded by first inner surfaces 115, side surfaces 133, and support surfaces 126. As such, protrusions 114 secure roller 101 from upwards movement or displacement when roller 101 is disposed in cavity 111. Protrusions 114 may extend from first inner surfaces 115 enough to be able to simultaneously allow roller 101 to be forcibly (e.g., manually) placed substantially or mostly below protrusions 114 (e.g., protrusions 114 may be disposed above axis of rotation A of roller 101) and prevent roller 101 from moving upwards past protrusions 114 when in use (e.g., after installation). In some examples, there may be a gap 122 (see, e.g., FIG. 6, FIG. 9) between a protrusion 114 and roller 101 when roller 101 is disposed in cavity 111 to prevent frictional contact between the protrusions 114 and roller 101 unless roller 101 moves undesirably upwards. Protrusions 114 may also be configured to fit into protrusion recesses 127 of support adapter 103, as described later. For example, support adapter 103 may be configured to snap into support portion 102. For example, when support adapter 103 is placed on support base 102, bottom ledge 135 (see, e.g., FIG. 6) of bottom portion 110 of support adapter 103 may extend past (e.g., more outwards than) an innermost point 136 (e.g., an apex) of a protrusion 114. As such, bottom ledge 135 (or the wall into which it is formed) may temporarily (e.g., elastically) deform slightly inwards when support adapter 103 snaps into support base 102. Similarly, the protrusion 114 (or the wall onto which it is formed) be temporarily (e.g., elastically) deform when the support adapter 103 snaps into support base 102. Bottom ledge 135, protrusions 114, and the walls into/onto which they are formed may then snap back once the protrusion 114 is received in the corresponding protrusion recess 127 of support adapter 103. Similar deformations may occur as the support adapter 103 is removed from (snapped out of) support base 102. As such, support adapter 103 may be securely and removably attached to support base 102 in such a configuration.

Cavity 111 may be further defined, in part, by side surfaces 133 (see, e.g., FIG. 8). Side surfaces 133 may be disposed on an inside of support portion 109 and at least a portion of side surfaces 133 may be configured to contact roller 101; alternatively, side surfaces 133 may be configured to be spaced from roller 101. In some examples, side surfaces 133 may be angled (e.g., not parallel) with respect to a vertical axis B (see, e.g., FIGS. 3, 4) as illustrated. For example, a bottom portion of side surfaces 133 may be closer to parallel with vertical axis B than a top portion of side surfaces 133. In addition, when viewed in a top view (such as FIG. 10), the side surfaces may be flared outward at the center (away from central aperture 123) to further reduce contact with the respective ends of roller 101. In examples, this arrangement permits only the bottom portion of side surfaces 133 to contact roller 101 (when roller 101 is snapped into cavity 111), thereby decreasing friction that would otherwise resist rotation of roller 101. Side surfaces 133 may be substantially adjacent to first inner surfaces 115, side apertures 124, and top surfaces 120. Side surfaces 133 may also be disposed in support adapter 103 and may function similarly (see, e.g., FIG. 4).

Support portion 109 may include first inner surfaces 115 (see, e.g., FIG. 8), partially defining cavity 111. First inner surfaces 115 may be substantially adjacent and perpendicular to side surfaces 133. First inner surfaces 115 may be disposed on an inside of support portion 109, and at least a portion of first inner surfaces 115 may be configured to contact roller 101. Protrusions 114 may be disposed on first inner surfaces 115. In some examples, first inner surfaces 115 may be angled with respect to vertical axis B as illustrated (see, e.g., FIG. 6). For example, a bottom portion of first inner surfaces 115 may be closer to vertical axis B than a top portion of first inner surfaces 115. First inner surfaces 115 may also be disposed in support adapter 103 and may function similarly (see, e.g., FIG. 3).

Figure 3:
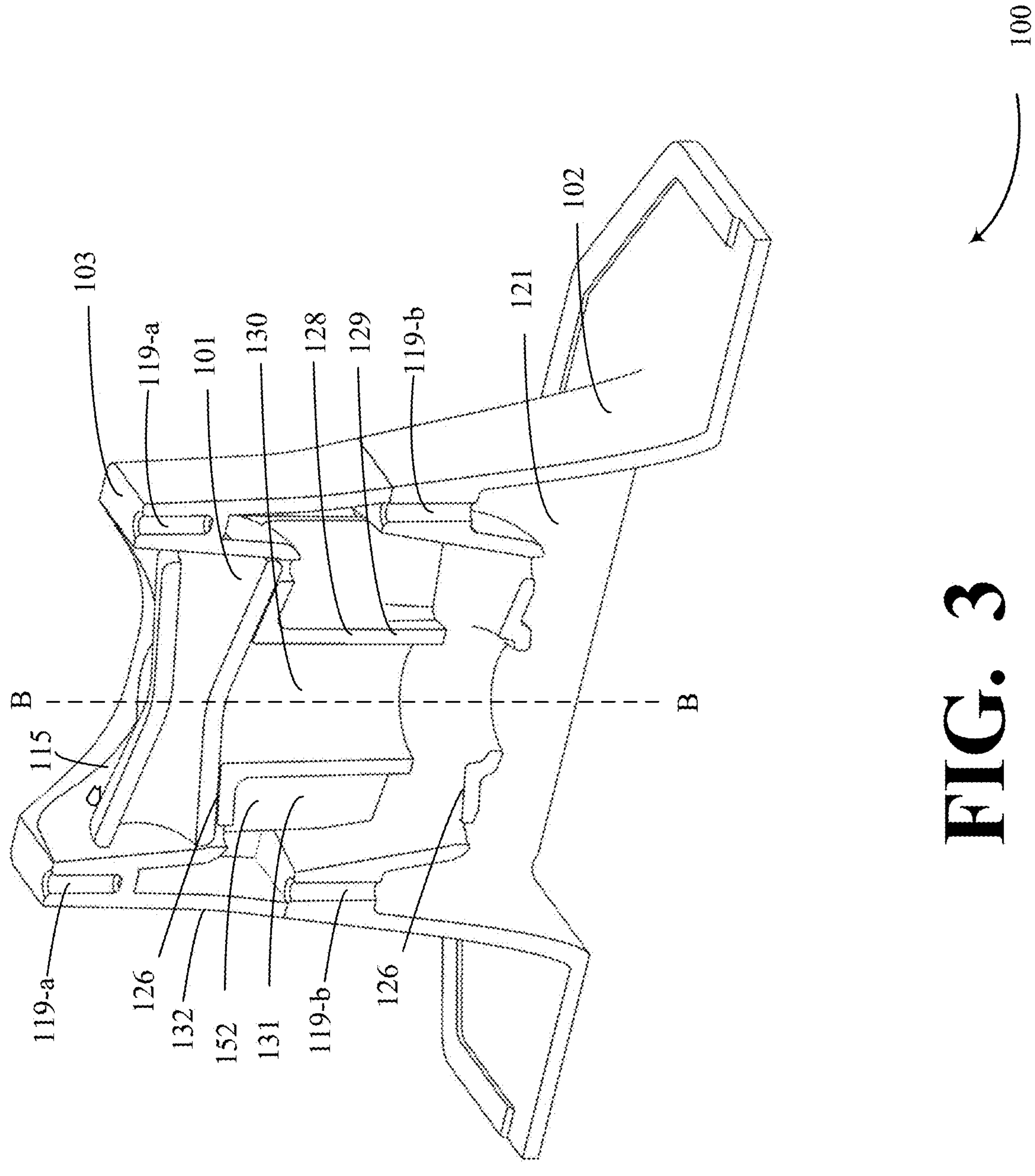
FIG. 3 illustrates a cross-sectional, perspective view of an example pipe support system.

Support portion 109 may include supporting surfaces 126 (see, e.g., FIG. 3). Supporting surfaces 126 may be disposed under roller 101 when roller 101 is placed in support portion 109 (see, e.g., FIG. 8). In examples, supporting surfaces 126 may generally match the contour of roller 101. For example, supporting surfaces 126 may be angled with respect to flat base portion 134 at substantially the same angle as surfaces 117 (see, e.g., FIG. 1) of roller 101. In some examples, supporting surfaces 126 may be coated with graphite or any other substance that reduces friction to lessen friction between supporting surfaces 126 and surfaces 117 of roller 101. In some examples, surfaces 117 of roller 101 may contact supporting surfaces 126 when roller 101 is disposed in support adapter 103 or support base 102. In some other examples, roller 101 may (e.g., only) contact support adapter 103 and/or support base 102 at substantially the outside edges 138 (see, e.g., FIG. 8) of roller 101 (e.g., the portions of roller 101 with the largest diameter or at opposite ends of roller 101). For example, the roller 101 may be angled slightly differently from support surfaces 126 to minimize the points of contact between the roller 101 and the supporting surfaces 126. In addition, the presence of central aperture 123 further limits the surface area of support base 102 (and/or support adapter 103) in contact with an installed roller 101, thereby further lessening the friction incurred by rotation of the roller 101. Supporting surfaces 126 may also be disposed in support adapter 103 (see, e.g., FIG. 3) and function similarly as described.

Support portion 109 may include apertures 119-*b* (see, e.g., FIG. 3). Apertures 119-*b* may be disposed through top surfaces 120 of support portion 109. Apertures 119-*b* may extend through support portion 109 and to lower cavity 121 of support portion 109. Apertures 119-*b* may be configured to receive a fastener (e.g., a screw). For example, an installer may install a pipe strap to keep a pipe disposed on roller 101 from falling off, and fasteners may be used to secure the pipe strap to support portion 109 when received by the apertures 119-*b*.

Support portion 109 may include central aperture 123 (see, e.g., FIG. 8, FIG. 10) and side apertures 124. Side apertures 124 may be disposed in supporting surfaces 126 and extend through supporting surfaces 126 to lower cavity 121 of support portion 109. Central aperture 123 may be disposed substantially in the center of support portion 109 and extend from curved surfaces 112 to lower cavity 121 of support portion 109. In some examples, support portion 109 may include a ledge 125 disposed around central aperture 123 and adjacent to lower cavity 121. Central aperture 123 and side apertures 124 may serve to drain fluid (e.g., water) to prevent fluid from accumulating at the bottoms of cavity 111 of support portion 109. For example, side apertures 124 may be disposed at a lowest point of supporting surfaces 126 to drain fluid from the inside of support portion 109 of support base 102. In some examples, central aperture 123 and side apertures 124 may allow for air to escape, for example, to prevent pipe support system 100 from becoming buoyant should water or a liquid accumulate on the surface the pipe support system 100 is disposed on (e.g., a roof). Side apertures 124 and central aperture 123 may also limit the surface area of support base 102 (and/or support adapter 103) in contact with an installed roller 101, thereby further lessening the friction incurred by rotation of the roller 101. In some examples, side apertures 124 may be substantially adjacent to side surfaces 133 of support portion 109 of support base 102. Side apertures 124 may also be disposed in support adapter 103 (see, e.g., FIG. 4) and function similarly as described. However, support adapter 103 may include a different (e.g., but of a similar or substantially same diameter) cylindrical aperture 130 (see, e.g., FIG. 3) that may share a common longitudinal axis B with central aperture 123 of support base 102.

As described, support adapter 103 (see, e.g., FIGS. 1, 5, 6, 17-20) may include one or more similar features as support base 102, in particular, support portion 109. For example, support adapter 103 may include cavity 111, curved surfaces 112, side surfaces 133, supporting surfaces 126, protrusions 114, first inner surfaces 115, gap 122, and/or side apertures 124, which may be similar or the same as the corresponding portions of support base 102 (e.g., to facilitate stacking and/or installation of roller 101 as described previously). Top surfaces 120 of support adapter 103 may be similar to top surfaces 120 of support base 102, though slightly smaller due to the tapering of the support adapter 103 compared to support base 102. Support base 102 may be configured to receive support adapter 103 in cavity 111 of support base 102. As such, repeated discussion is omitted for brevity. Other features of support adapter 103 may be different or additional and are discussed.

In some examples, apertures 119-*a* (see, e.g., FIG. 3, 18) on support adapter 103 may extend from top surfaces 120 of support adapter 103 partially through support adapter 103 (e.g., may stop short before connecting with lower cavity 131 of support adapter 103). In some examples, apertures 119-*b* on support base 102 may extend through support base 102 and to lower cavity 121 of support base 102.

Bottom portion 110 of support adapter 103 may be configured to fit into cavity 111 of support base 102. For example, protrusions 114 of support base 102 may be configured to fit into protrusion recesses 127 (see, e.g., FIG. 1, FIG. 5, FIG. 6, FIGS. 17-20) of support adapter 103. In examples, at least a portion of protrusion recesses 127 may have substantially the same or a similar shape and size as protrusions 114 but inverted as a recess rather than a protrusion (e.g., the shapes of the protrusion and protrusion recess may be complementary). When protrusions 114 fit into protrusion recesses 127, support adapter 103 is configured to snap fit snugly into support base 102. For example, no fasteners or other securing mechanisms may be required in order to secure support adapter 103 to support base 102. For example, motion of support adapter 103 may be substantially constrained in all degrees of freedom by the configuration of pipe support system 100 as described. Additionally, the weight of a supported pipe may provide additional constraint from movement of support adapter 103 away from support base 102. At least a portion of bottom portion 110 of support adapter 103 may extend below top surfaces 120 of support base 102 and at least a portion of curved surfaces 112, constraining horizontal movement and rotational movement of support adapter 103. For example, as illustrated in, for example, FIG. 6, at least a portion of insert 128 of bottom portion 110 of support adapter 103 may come into close proximity with (e.g., may be substantially adjacent to) or contact side surfaces 133 and/or first inner surfaces 115, constraining horizontal and rotational movement.

Bottom portion 110 of support adapter 103 may include insert 128 (see, e.g., FIG. 3, 17, 20). Insert 128 may define cylindrical aperture 130 (see, e.g., FIG. 3), which is bounded by cylindrical wall 129 of insert 128. Insert 128 may extend below top surfaces 120 of support portion 109 of support base 102 when support adapter 103 is placed on support base 102. When stacked with support base 102, cylindrical aperture 130 may share a same vertical axis B with central aperture 123 of support portion 109 of support base 102. Bottom portion 110 may include lower cavity 131. Lower cavity 131 may be bounded by side walls 132 of support adapter 103 and by wall 129 of insert 128. Insert 128 may also comprise a plurality of spoke walls 152. Spoke walls 152 (see, e.g., FIGS. 1, 19) may extend outwards from cylindrical wall 129, and protrusion recesses 127 may be formed in spoke walls 152. Although four spoke walls 152 are depicted, other numbers are possible and contemplated. In some examples, spoke walls 152 may flex inwards while being assembled with support base 102 or another support adapter 103 (e.g., when in contact with protrusions 114) to allow for a snap fit of support adapter 103 into the support base 102 or into another support adapter 103.

Support base 102 and/or support adapter 103 may be formed from metals, plastics, ceramics, or any combination of these, among other materials. This provides material strength for the pipe support system 100 to support the pipes placed thereon. Additionally, the pipe support system 100 can be used in any type of environmental conditions. Support base 102 and/or support adapter 103 being formed of plastic enables complex shapes to be formed and snap fitting between components to be achieved. Additionally, the material of the rollers 101 decrease frictional resistance when moving relative to the support base 102 and/or support adapters 103 so that as the supported pipe(s) move, the pipe support system 100 does not tip over. It should be appreciated that the material utilized in the pipe support system 100 described herein may be any of those typically utilized for building component manufacture and the specific materials described above are only exemplary and are not to be considered as limiting.

Generally, the components of the pipe support systems described herein are sized and shaped (e.g., via the cross-sectional profiles and/or structural shape) to provide load bearing support for the one or more pipes placed thereon. Additionally, the components reduce the chances of tipping of the pipe support system (e.g., during loading of the pipe(s)) and facilitate easy on-site assembly. The components can be mixed and matched as required or desired from the pipe support systems described herein. For example, the pipe support systems described herein are configured to be field-assembled and adjustable to support one or more pipe(s) installed above an underlying surface (e.g., a roof surface). The pipe supports systems are robust so as to accommodate heavy piping while not tipping over.

The examples described herein provide for a relatively easy installation procedure for an installer. An installer may place support base 102 on a surface, for example, a flat rooftop. In some examples, the installer may desire to further secure support base 102 to the surface, for example, using adhesive materials. In some examples, the installer may fit support adapter 103 on top of support base 102. Protrusions 114 of support base 102 may fit into protrusion recesses 127 of support adapter 103, securing support adapter 103 to support base 102. The installer may place additional support adapters 103 on top of the first support adapter 103 if additional height is desired. For example, if multiple adapters are desired to reach a certain height, in some examples the side walls 132 of the additional support adapters 103 may be configured to extend substantially vertically (rather than continuing to taper inwards), with respect to base portion 104 or a horizontal surface on which base portion 104 may sit, such that multiple support adapters 103 may be stacked on top of one another with side walls 132 across the multiple support adapters 103 forming a smooth and/or continuous outside surface. Alternatively, pipe support system 100 may include only one support adapter 103 supported on support base 102. The installer may place roller 101 in the topmost component (e.g., support base 102 when no support adapters 103 are installed, or the topmost support adapter 103). For example, the installer may place roller 101 in cavity 111 of the topmost component. The installer may then place additional pipe support systems 100 on top of the surface (e.g., roof) in accordance with where the pipe should be routed. The installer may then place pipe(s) on each roller 101 of pipe support systems 100. In some examples, the installer may install pipe straps to keep the pipe(s) disposed on rollers 101 from falling off, and fasteners may be used to secure the pipe straps to pipe support systems 100 when received by the apertures 119 of the topmost components.

The examples described herein provide for relatively easy and efficient shipping of support bases 102 and/or support adapters 103. For example, multiple support adapters 103 and/or multiple support bases 102 (or any combination of support adapters 103/support bases 102) may be stacked on top of one another to facilitate space efficient shipping. When multiple support bases 102 are stacked, support portion 109 of one support base 102 may fit into lower cavity 121 of another support base 102. As mentioned previously, bands may be used to wrap around a stack of support bases 102 and/or one or more support adapters 103, where the bands fit into side indents 139 to secure the stack.

In some examples, roller 101 may not be included in pipe support system 100. For example, a pipe may be able to rest in curved surfaces 112 of support adapter 103 or support base 102 without roller 101. Support bases 102 and support adapters 103 can later be easily adapted to support axial movements of supported pipes by adding rollers 101.

Figure 5:
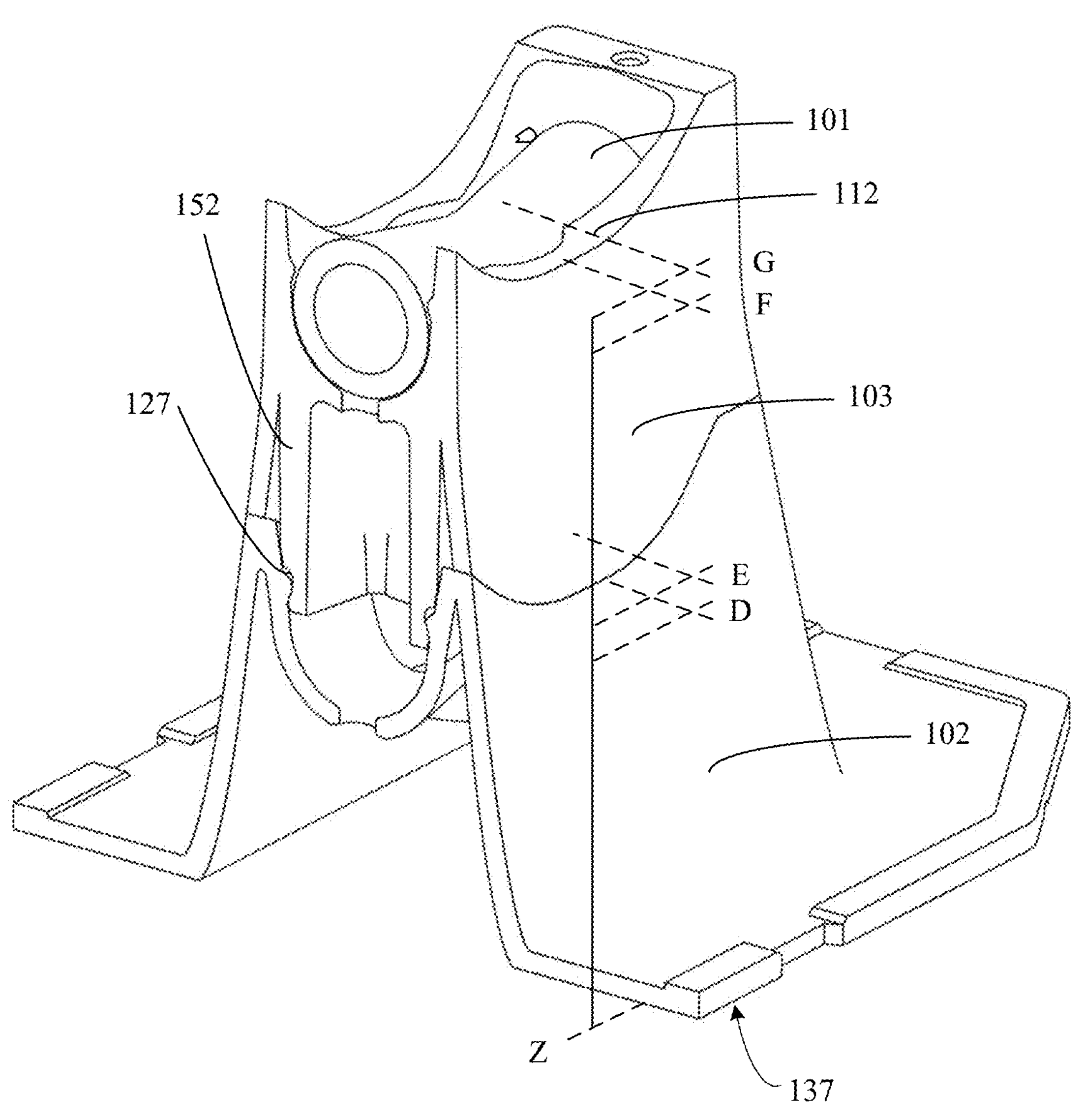
FIG. 5 illustrates a cross-sectional, perspective view of an example pipe support system.

When installed, a lowest portion of roller 101 sits at a height slightly above a lowest portion of curved surfaces 112 so that supported pipes will contact roller 101 rather than curved surfaces 112. Referring to FIG. 5, in some examples, a shortest distance from bottom surface 137 of support base 102 to a lowest point of curved surfaces 112 of support base 102 (e.g., where a pipe may rest without roller 101) may be approximately 2 inches (see, e.g., FIG. 5) (e.g., from level Z to level D). In some examples, a shortest distance from bottom surface 137 of support base 102 to the lowest point of roller 101 (e.g., where a pipe may rest with roller 101) when roller 101 is disposed in support base 102 may be approximately 2 and ⅛ inches (e.g., from level Z to level E) (see, e.g., FIGS. 5 and 8). In some examples, a shortest distance from bottom surface 137 of support base 102 to the lowest point of curved surfaces 112 of support adapter 103 (e.g., where a pipe may rest without roller 101) may be approximately 4 inches (e.g., from level Z to level F). In some examples, a shortest distance from bottom surface 137 of support base 102 to the lowest point of roller 101 (e.g., where a pipe may rest with roller 101) when roller 101 is disposed in support adapter 103 may be approximately 4 and ⅛ inches. (e.g., from level Z to level G). Other (e.g., larger) dimensions and scales of presently described examples are possible and contemplated.

Although the present disclosure discusses the implementation of these techniques in the context of a pipe support assembly for piping and on a roof, the technology introduced above may be implemented for a variety of support needs. A person of skill in the art will understand that the technology described in the context of supporting pipe on a roof could be adapted for use with other systems such as supporting substantially any elongated member on substantially any surface. Additionally, a person of ordinary skill in the art will understand that the pipe support assembly may be implemented or installed with a variety of setups.

Those skilled in the art will recognize that the methods and systems of the present disclosure may be implemented in many manners and as such are not to be limited by the foregoing aspects and examples. In this regard, any number of the features of the different aspects described herein may be combined into single or multiple aspects, and alternate aspects having fewer than or more than all of the features herein described are possible. Functionality may also be, in whole or in part, distributed among multiple components, in manners now known or to become known.

Moreover, the scope of the present disclosure covers conventionally known manners for carrying out the described features and functions, and those variations and modifications that may be made to the components described herein as would be understood by those skilled in the art now and hereafter.

Figure 4:
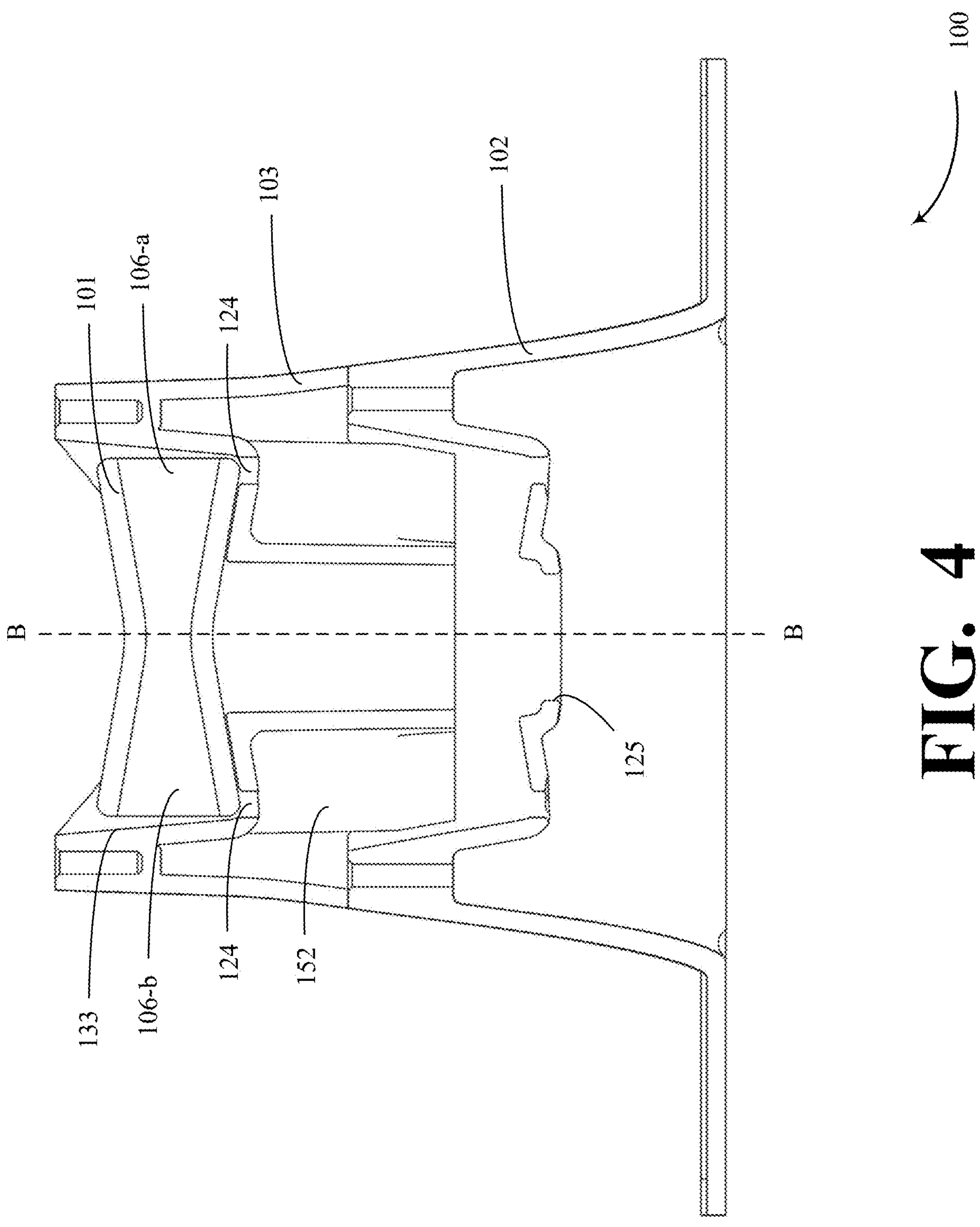
FIG. 4 illustrates a cross-sectional, side view of an example pipe support system.

Further, as used herein and in the claims, the phrase “at least one of element A, element B, or element C” is intended to convey any of: element A, element B, element C, elements A and B, elements A and C, elements B and C, and elements A, B, and C. In addition, one having skill in the art will understand the degree to which terms such as “about” or “substantially” convey in light of the measurements techniques utilized herein. To the extent such terms may not be clearly defined or understood by one having skill in the art, the terms “about” and “substantially” shall mean plus or minus ten percent or, if in relation to an angle, plus or minus ten degrees. Additionally, terms such as “inwards” and “outwards” or the like may be defined in a standard fashion. Relative positioning terms like “top,” “bottom,” “up,” “down,” or other such terms may be used with respect to the directions when viewing each drawing and/or may be used with respect to proximity to the ground when components are installed in the intended manner. For example, “bottom” is more proximal to the ground than “top,” and “upwards” means substantially away from the ground while “downward” means substantially towards the ground, when installed. FIG. 4 is an example of a pipe support system 100 oriented as intended for installation.

Numerous other changes may be made which will readily suggest themselves to those skilled in the art and which are encompassed in the spirit of the disclosure and as defined in the appended claims. While various aspects have been described for purposes of this disclosure, various changes and modifications may be made which are well within the scope of the disclosure. Numerous other changes may be made which will readily suggest themselves to those skilled in the art and which are encompassed in the spirit of the disclosure and as defined in the claims.

What is claimed is:

1. A pipe support system, comprising:

a roller configured to support a pipe;

a support adapter, wherein the support adapter is configured to receive the roller in a first cavity of the support adapter, and wherein the roller is configured to rotate in the first cavity; and a support base configured to receive the support adapter in a second cavity of the support base;

wherein the support adapter is configured to snap into the support base.

2. The pipe support system of claim 1, wherein the support base comprises:

a base portion comprising a substantially flat base surface; and a support portion extending upwards from the substantially flat base surface.

3. The pipe support system of claim 1, wherein the support base comprises at least one first protrusion disposed on a first inner surface of the support base, wherein the first protrusion extends from the first inner surface into the second cavity.

4. The pipe support system of claim 3, wherein the support adapter comprises at least one protrusion recess configured to receive the at least one first protrusion of the support base.

5. The pipe support system of claim 3, wherein the support adapter comprises at least one second protrusion disposed on a second inner surface of the support adapter, wherein the first protrusion extends from the second inner surface into the first cavity, and wherein the roller is configured to fit into the first cavity substantially below the at least one second protrusion.

6. The pipe support system of claim 1, wherein the support base comprises at least one slot disposed on an underside of the support base.

7. The pipe support system of claim 1, wherein the support base comprises a plurality of curved surfaces having substantially concave shapes, and wherein the support adapter comprises a corresponding plurality of curved portions having substantially convex shapes, and wherein the curved portions are configured to fit into and contact the plurality of curved surfaces.

8. The pipe support system of claim 1, wherein the support base, the support adapter, or a combination thereof, comprises a plurality of apertures disposed on top surfaces of the support base, the support adapter, or the combination thereof, and wherein the plurality of apertures are configured to receive corresponding fasteners to secure a pipe strap to the pipe support system.

9. The pipe support system of claim 1, wherein the first cavity is substantially identical to the second cavity.

10. The pipe support system of claim 1, wherein the support base and the support adapter combine to define a central aperture extending through the support base and the support adapter.

11. A pipe support system, comprising:

a roller configured to support a pipe; and a support base configured to receive the roller in a first cavity of the support base, wherein the support base comprises:

a base portion comprising a substantially flat base surface; and a support portion extending upward from the substantially flat base surface;

wherein the roller is configured to snap into the first cavity and be freely rotatable within the first cavity; and wherein the support base comprises at least one slot disposed on an underside of the support base.

12. The pipe support system of claim 11, wherein the support base comprises at least one first protrusion disposed on a first inner surface of the support base.

13. The pipe support system of claim 11, wherein the support base comprises a plurality of curved surfaces having substantially concave shapes.

14. The pipe support system of claim 13, wherein a lowest portion of the roller extends above a lowest portion of the plurality of curved surfaces when the roller is snapped into the support base.

15. The pipe support system of claim 14, wherein the support base comprises a plurality of side apertures disposed on supporting surfaces of the support base, and wherein the support base comprises a central aperture extending through a bottom of the support base and into the first cavity.

16. A pipe support system, comprising:

a roller configured to support a pipe;

a first support adapter, comprising a first top portion defining a first cavity and a first lower portion defining a first insert, wherein a first protrusion is formed in the first cavity, wherein the first cavity is configured to receive the roller substantially below the first protrusion, and wherein a first protrusion recess is disposed in a first wall of the first insert; and a support base defining a second cavity and configured to receive the insert in the second cavity, wherein the second cavity includes a second protrusion having a complementary shape to the first protrusion recess.

17. The pipe support system of claim 16, further comprising a second support adapter, comprising a second top portion defining a third cavity and a second lower portion defining a second insert, wherein a third protrusion is formed in the third cavity, wherein the third cavity is configured to receive the roller substantially below the third protrusion, and wherein a second protrusion recess is disposed in a second wall of the second insert, the second protrusion recess is shaped complementary to the first protrusion.

18. The pipe support system of claim 16, wherein the roller is configured to snap alternately into each of the first cavity, the second cavity, and the third cavity.

* * * * *